US006983196B2

(12) United States Patent
Green et al.

(10) Patent No.: US 6,983,196 B2
(45) Date of Patent: Jan. 3, 2006

(54) ELECTRONICALLY CONTROLLED VEHICLE LIFT AND VEHICLE SERVICE SYSTEM

(75) Inventors: Steven D. Green, Madison, IN (US); Larry D. O'Cull, Madison, IN (US); Sarah A. Cox, Madison, IN (US); Michael R. O'Cull, Madison, IN (US); Douglas J. Brown, Madison, IN (US); Cory J. Powell, Madison, IN (US)

(73) Assignee: Delaware Capital Formation, Inc., Wilmington, DE (US)

( * ) Notice: Subject to any disclaimer, the term of this patent is extended or adjusted under 35 U.S.C. 154(b) by 368 days.

(21) Appl. No.: 10/055,800

(22) Filed: Oct. 26, 2001

(65) Prior Publication Data

US 2002/0175319 A1 Nov. 28, 2002

Related U.S. Application Data

(60) Provisional application No. 60/243,827, filed on Oct. 27, 2000.

(51) Int. Cl.
*G05B 15/00* (2006.01)

(52) U.S. Cl. ........................ 700/275; 254/45; 254/93 L

(58) Field of Classification Search ................ 700/275; 414/540, 785, 546; 33/288; 254/89 R, 45, 254/93 L; 701/7

See application file for complete search history.

(56) References Cited

U.S. PATENT DOCUMENTS

| | | | | |
|---|---|---|---|---|
| 5,299,904 | A * | 4/1994 | Simon et al. | 414/540 |
| 5,341,575 | A * | 8/1994 | Chisum | 33/288 |
| 5,679,934 | A | 10/1997 | Juntunen et al. | 187/395 |
| 5,829,948 | A * | 11/1998 | Becklund | |
| 6,286,629 | B1 * | 9/2001 | Saunders | 187/394 |

FOREIGN PATENT DOCUMENTS

| | | |
|---|---|---|
| DE | 91 15 317 U | 3/1992 |
| EP | 0 615 645 A | 9/1994 |

OTHER PUBLICATIONS

Patent Abstracts of Japan vol. 1997, No. 04 Apr. 30, 1997 & JP08 333093 A (Sugiyasu Kogyo KK), Dec. 17, 1996 Abstract.

* cited by examiner

*Primary Examiner*—Albert W. Paladini
(74) *Attorney, Agent, or Firm*—Frost Brown Todd LLC

(57) ABSTRACT

A vehicle lift has an electronic control which is functional to control the raising and lowering of the lift and to enable the display of a variety of information regarding the operation of the lift. The electronic control includes control logic which generates an operation fault indication signal based on the application of predetermined criteria to operation conditions, with concomitant display of data indicative of the operation fault indication signal accompanied by inhibiting or altering raising or lowering of the lift. The electronic control also includes maintenance control logic which generates a maintenance condition indication signal to enable generation of maintenance notice data. A vehicle service system includes a network placing controls of such vehicle lifts in communication with each other or a central computer processor.

162 Claims, 14 Drawing Sheets

ELECTRONICALLY CONTROLLED VEHICLE LIFT AND VEHICLE SERVICE SYSTEM

This application claims priority from U.S. Provisional Application Ser. No. 60/243,827, filed Oct. 27, 2000, the disclosure of which is incorporated herein by reference.

BACKGROUND OF THE INVENTION

This invention relates generally to vehicle lifts and their controls, as well as to vehicle service systems having such vehicle lifts and controls. The invention is disclosed in conjunction with a unique electronic control which is simple and intuitive to operate, which may be stand alone or networked to other lift controls of the vehicle service system.

Hydraulic and electromechanical (screw) vehicle lifts for raising and lowering vehicles are well known. While the design and configuration of vehicle lifts vary, they all are used primarily for servicing vehicles. They must all have some type of control system to effect the raising and lowering function.

Prior art control systems for hydraulic lifts typically include an electric switch wired in series with the pump motor for raising the lift and a manually operated lowering valve for lowering the lift. Raising and lowering a vehicle into position requires a series of steps. Raising a vehicle with such a hydraulic lift requires depressing the electric switch to raise the vehicle, followed by operating the lowering valve to lower the lift to the locking mechanism. To lower a vehicle beyond the locking mechanism, such as to the ground, the first step is disengagement of the latches, which may be manually, electrically or pneumatically disengaged. The technician must first raise the lift off of the latches, and then either manually disengage the latches, or operate an electric switch or a pneumatic valve through a lever. The technician next operates the lowering valve while continuously operating the electric switch or pneumatic valve to hold the latches disengaged.

The vehicle lift and the area close by the lift, within which the technician moves and works on the vehicle is generally called the lift bay or service bay. To use the vehicle lift properly and safely, the technician needs accurate information regarding the safe operation and maintenance of the lift, such as for example vehicle lift points, operating conditions of the lift, maintenance and trouble shooting information. While working on a vehicle, a technician needs immediate access to current and accurate information regarding operating the lift and servicing the vehicle.

Typically, the information needed by a technician is not available at the lift bay. While the needed information is generally available as manuals or other printed form, such are frequently not kept in the service bay, if kept anywhere at all, and may be outdated. To obtain the information, the technician is thus usually required to leave the bay and locate the information. A technician may be unwilling to leave the bay to locate the information, since this adds another step to the technician's work schedule. A technician works more efficiently if everything needed to work on the vehicle is within the bay. Time spent by a technician away from the bay to obtain information, parts, process paper work, etc. detracts from the efficient performance of service on the vehicle.

Instruction on proper lift use is important for new technicians or new lifts. In such training situations, instruction may not occur at all if much effort is required to learn or teach the use of the lift or to locate the relevant instructional material. Instruction may be given by other technicians who may themselves not be aware of the proper operation of the lift, relying instead on their own understanding of operating the lift.

Proper lift maintenance is also important. Routine maintenance needs to be performed to keep a lift operating properly and safely. Although the need for preventative maintenance arises from the usage of the lift, information on preventative maintenance of lifts is not always readily available. Routine maintenance schedules may be kept independent of the lifts, and the technician does not know while he is in the lift bay whether routine maintenance needs to be performed. Maintenance information regarding repair or trouble shooting information is also typically not kept in the lift bay, resulting in limited or inefficient use of such important resource materials.

Although vehicle lifts define the service bay and are the focal point for servicing a vehicle, vehicle lifts themselves are considered secondary to other equipment used to service a vehicle. The view of the capabilities of a vehicle lift and its control has been limited to the raising and lowering functions, and has not extended to other functions. Thus, vehicle lifts and their controls have not been considered by those skilled in the art for providing access to information needed by the technician, or for collecting and transmitting information relative to operation of the lift of the servicing of the vehicle.

The present inventors have recognized that the overlooked vehicle lift and its control can meet the unrecognized needs for electronic delivery of information to and from the lift bay. The advent by the present invention of providing the ability to access, collect and transmit information by the vehicle lift control in addition to providing the lift functions, creates the new need to be able to revise the new non-lift functions of a lift control completely independent of the lift functions of the lift control. Because vehicle lifts are subject to third party certification, any changes to hardware or software which controls the lift functions, even if the changes only affect the non-lift functions, require recertification.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE INVENTION

Figure 1:
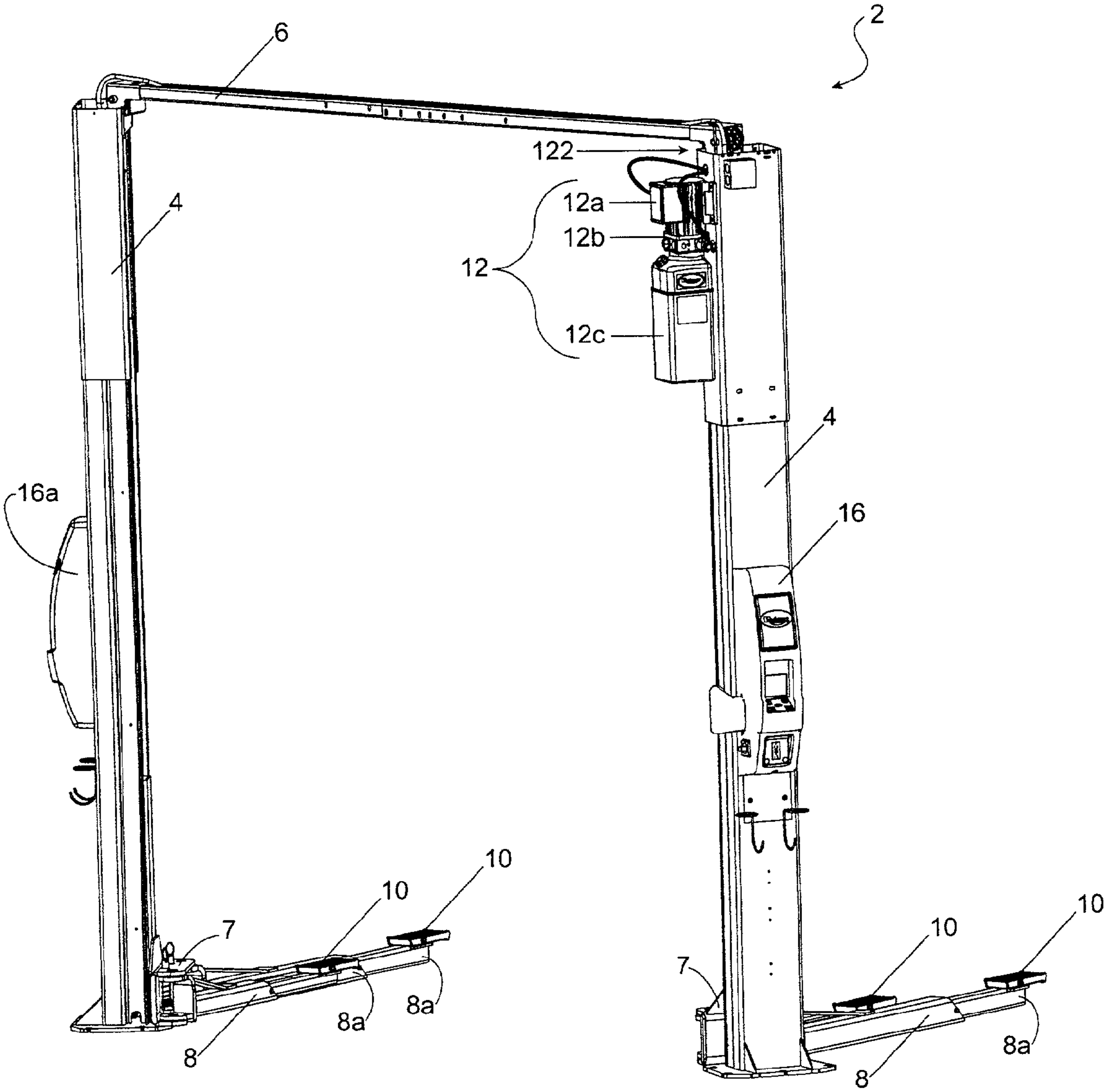
FIG. 1 is a perspective view of a two post vehicle lift with control in accordance with the present invention.

Referring now to the drawings in detail, wherein like numerals indicate the same elements throughout the views, FIG. 1 illustrates a perspective view of an asymmetric two post vehicle lift with an overhead cable equalization, generally indicated at 2. Although an asymmetric two post lift is illustrated, the present invention is not limited to such. Lift 2 includes two spaced apart columns or posts 4 connected at their respective tops by overhead beam 6. Each post 4 carries a respective carriage 7 which is moveable vertically along the respective post 4. Extending from each carriage 7 are two respective arms 8, shown pivoted to positions adjacent each other. In the embodiment depicted, each end 8*a* of arms 8 include flip up adapter 10 which engages the underside of the vehicle to be lifted. In this embodiment, adapters 10 have three positions which permit quick and easy contact with the pickup points on a variety of vehicles. Arms 8 may have any of a wide range of configurations which engage a vehicle in a variety of ways. Lift 2 includes power unit 12 which functions, in response to the control, to raise and lower arms 8. Power unit 12 can be any convenient power source suitable to raise and lower arms 8. In the embodiment depicted, power unit 12 is attached at the top end of one of posts 4 and includes electric motor 12*a* which drives hydraulic pump 12*b*. Hydraulic fluid for the hydraulic circuit is contained in reservoir 12*c*.

Although not shown, a spotting dish may be used with lift 2 to locate the vehicle in the appropriate position relative to columns 4.

On one of posts 4, lift 2 includes control assembly, generally indicated at 16. A slave control assembly 16*a* may be located on the other post 4, the operation of which will be described below.

Figure 2:
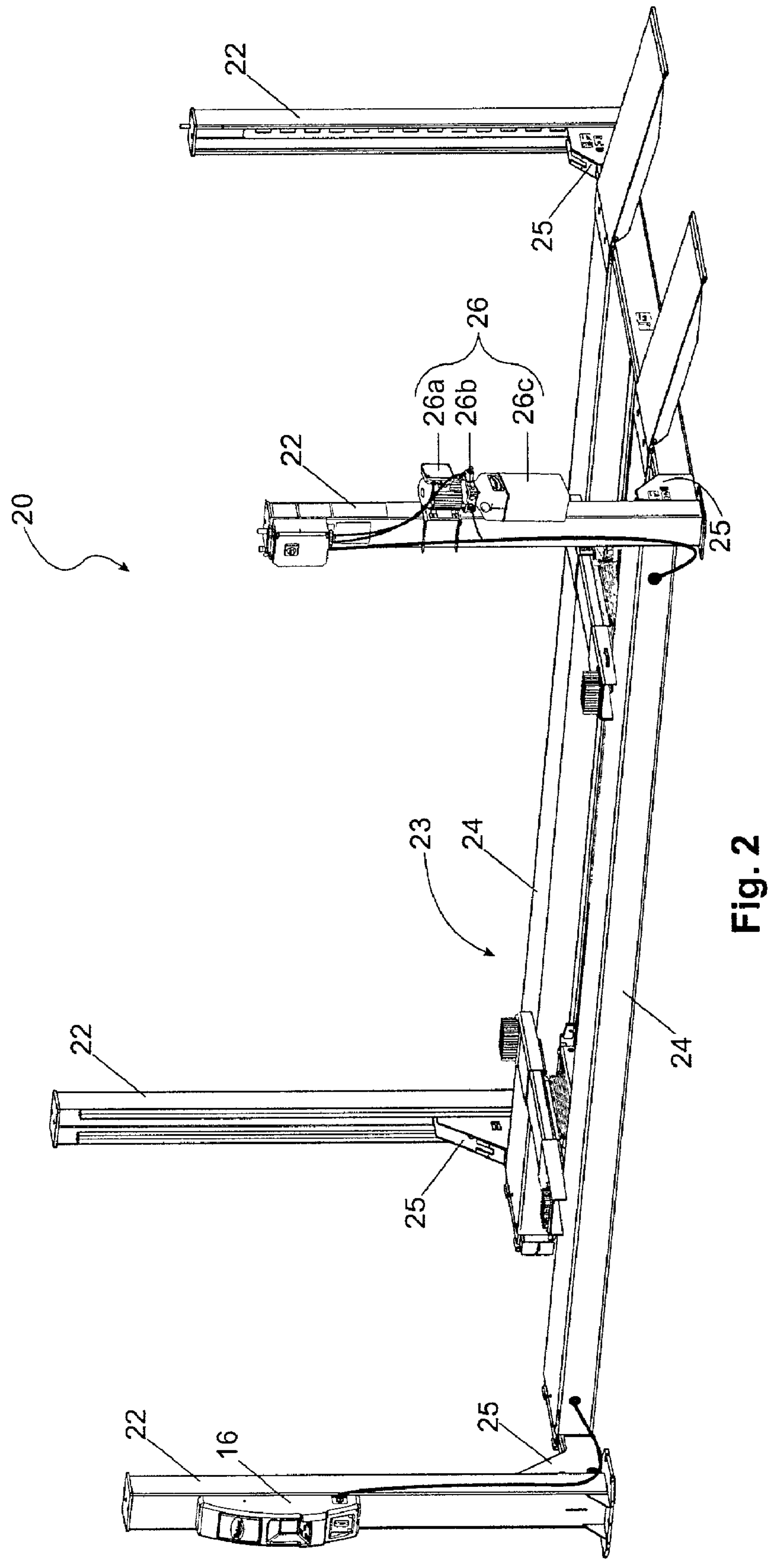
FIG. 2 is a perspective view of a four post vehicle lift with control in accordance with the present invention.

FIG. 2 illustrates a perspective view of a four post vehicle lift, generally indicated at 20. Lift 20 includes four spaced apart columns or posts 22, with control assembly 16 mounted to one of posts 22. Although not shown, slave control assembly 16*a* may also be located on one of the other posts 22. Lift 20 includes lifting platform 23 comprising a pair of runways 24, each being carried at both ends by a respective post 22 through a respective yoke 25 which is movable vertically along posts 22. As is well known, the vehicle to be lifted is driven onto runways 24 so that runways 24 engage the vehicle's tires. Lift 20 includes a power unit 26, located at one of the rear posts of lift 20, which functions in response to the control to raise and lower runways 24. Power unit 26 can be any convenient power source suitable to raise and lower runways 24. In the embodiment depicted, power unit 26 includes electric motor 26*a* which drives hydraulic pump 26*b*. Hydraulic fluid for the hydraulic circuit is contained in reservoir 26*c*.

Although the two lifts depicted in FIGS. 1 and 2 illustrate specific configurations of structures which engage the vehicle to be lifted, numerous configurations of structures currently exist and may be developed in the future. As used herein, movable lift engagement structure means those vertically movable parts of a vehicle lift which engage a vehicle in any manner so as to move the vehicle vertically in either direction, and includes, for example, arms 8 and runways 24. Although the two lifts depicted are surface lifts, the use of the control of the present invention is not limited to surface lifts.

Before describing control assembly 16 in detail, it is noted that although control assembly 16 is depicted as being attached to a post of a vehicle lift, it may be mounted separate from the lift which it controls, such as on wall or on a separate stand.

Figure 3:
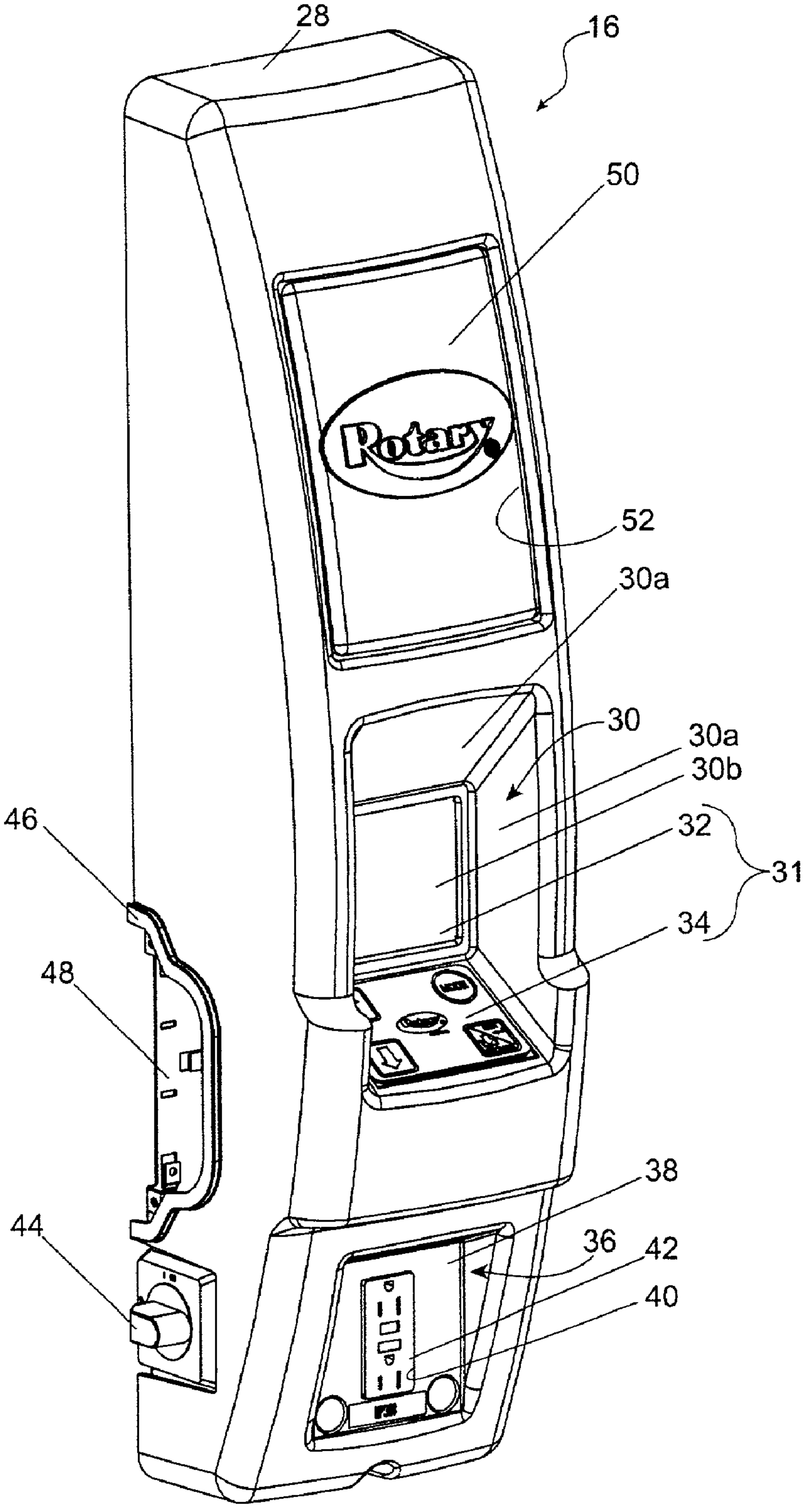
FIG. 3 is a perspective view of the control assembly of a vehicle lift in accordance with the present invention.

Turning now to FIG. 3, control assembly 16 of the present invention is illustrated. Control assembly 16 includes enclosure 28 which houses the control itself. Enclosure 28 is made of any suitably material. In the depicted embodiment, enclosure 28 is made of an industrial grade, glass filled polypropylene which has high impact resistance and is resistant to chemicals common to a garage where vehicles are serviced.

In the embodiment depicted, enclosure 28 includes first recessed area 30 having walls 30*a* extending inwardly toward a generally flat panel 30*b* which comprises display screen 32. Alternatively, display screen 32 could be omitted, as for slave control assembly 16*a*, and flat panel 30*b* could be formed integrally with enclosure 28 of the same material. Enclosure 28 carries user interface 31 comprising display screen 32 and key pad 34. Display screen 32 is disposed generally vertically at the rear thereof. In the embodiment depicted, display screen 32 is a LCD display, although any suitable display maybe used. By recessing display screen 32, glare is reduced.

Key pad 34 is disposed in first recessed area 30 below display screen 32. Key pad 34 is depicted as a generally flat panel which is tilted 30° up from horizontal, although any angle convenient to use may be used. Recessing key pad 34 aids in preventing accidental operation. As will be described in more detail below, key pad 34 comprises a keyboard with momentary contact switches underlying a flexible membrane which keeps contamination out of the switches. Any suitable user interface may be used, including for example, a touch screen display which functions as a switch to generate the desired signals upon touching the screen in the appropriate location. As will be described in detail below, in the embodiment depicted, key pad 34 comprises four keys formed as membrane switches. Although four keys are particularly suited for the particular embodiment depicted, it will be appreciated that more or less keys may be used. As used herein, key pad and keyboard include any user input device, including text input, touch screen input, etc.

Second recessed area 36 is disposed below first recessed area 30 having a generally vertical rear wall 38. Rear wall 38 includes opening 40 shaped complementarily to what ever component is to be disposed therein. In the embodiment depicted in FIG. 3, opening 40 is a rectangle, shaped complementarily to a standard rectangular ground fault circuit interrupt electrical outlet 42. Rear wall may also be formed without an opening.

Control assembly 16 includes electrical disconnect switch 44 disposed along a side thereof. Switch 44 functions as an on/off switch which can be locked in the off position and as an emergency stop switch. When switch 44 is turned off, there is no power to control assembly 16 beyond switch 44 so that the lift cannot be operated and electrical outlet 42 is not powered. This allows a single lift bay to be shut down, such as for servicing, rather than shutting down any other devices on that same electrical circuit.

Enclosure 28 includes opening 46 along one side thereof, which permits the necessary electric and pneumatic connections to the interior of enclosure 28. As illustrated below, such electrical and pneumatic connections may be made to control assembly 16 in a variety of ways, some through opening 46 and some not through opening 46. Visible through opening 46 is back plate 48, described below.

Enclosure 28 includes access panel 50 which snaps into place as shown in access opening 52. Access opening 52 allows access to the fasteners which secure back plate 48 in place. In one embodiment of the present invention, particularly for use with a two post vehicle lift, the locking mechanism is located directly behind access panel 50 to allow access thereto for manual latch disengagement in the event of a power outage. If access through access opening 52 is not necessary, access opening 52 and access panel 50 may be omitted, having in place thereof an integrally formed panel.

Figure 5:
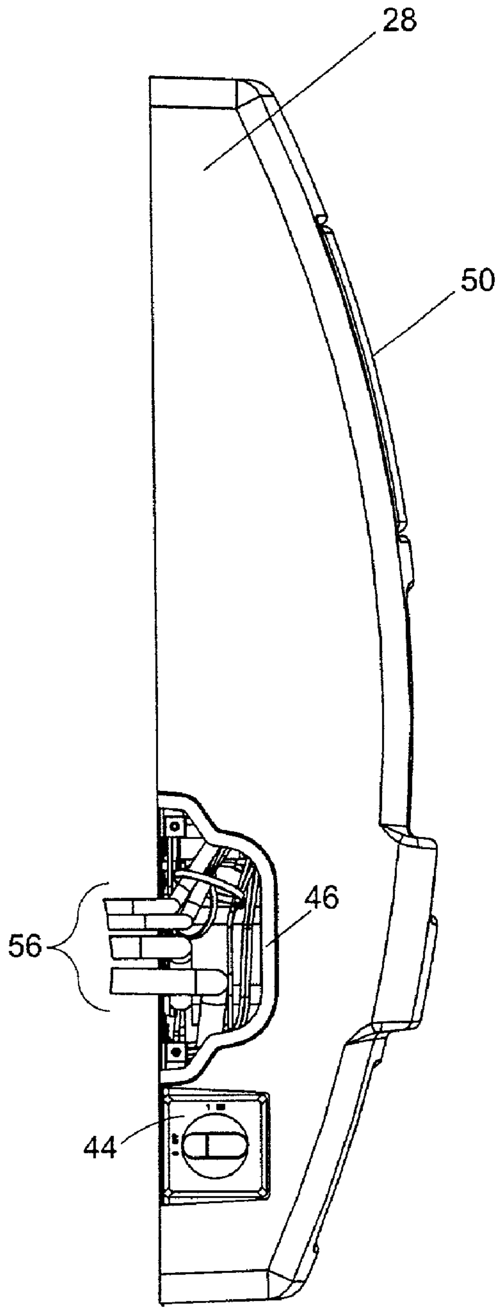
FIG. 5 is a side view of the control assembly of FIG. 3.
Figure 4:
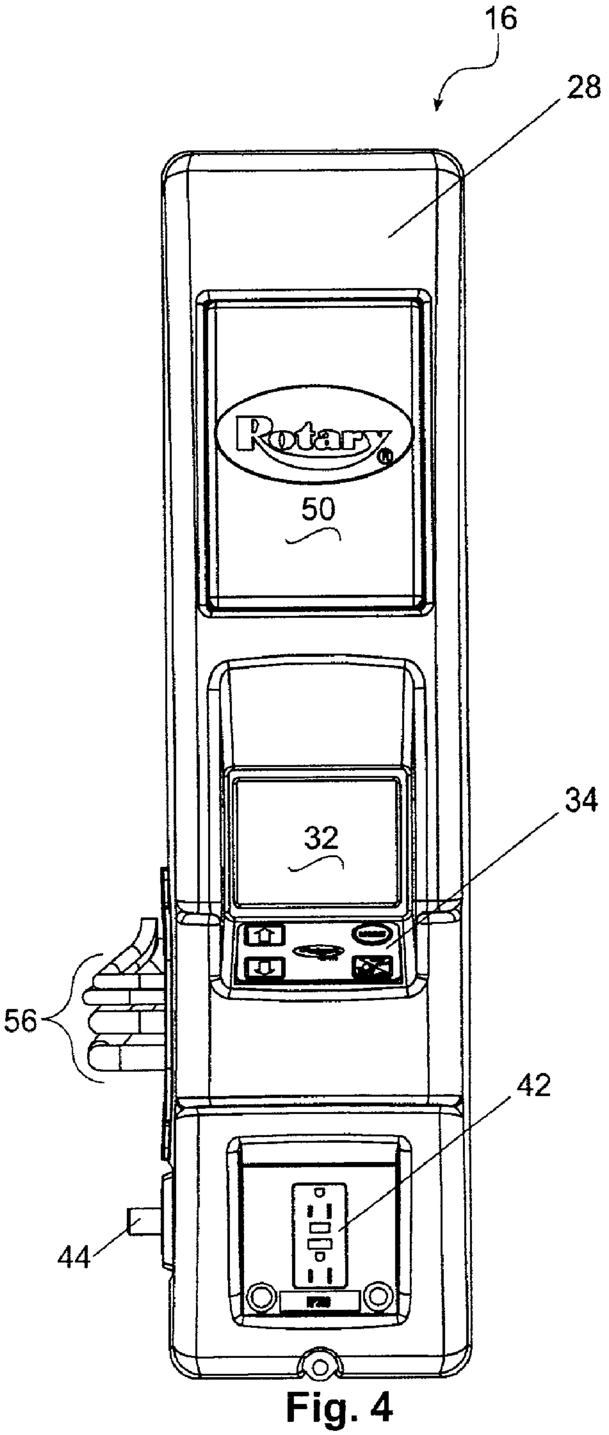
FIG. 4 is a front view of the control assembly of FIG. 3.

FIG. 4 is a front view and FIG. 5 is a side view of control assembly 16. Electrical and pneumatic lines 56 can be seen in FIG. 5 extending into the interior of enclosure 28 through opening 46.

Figure 6:
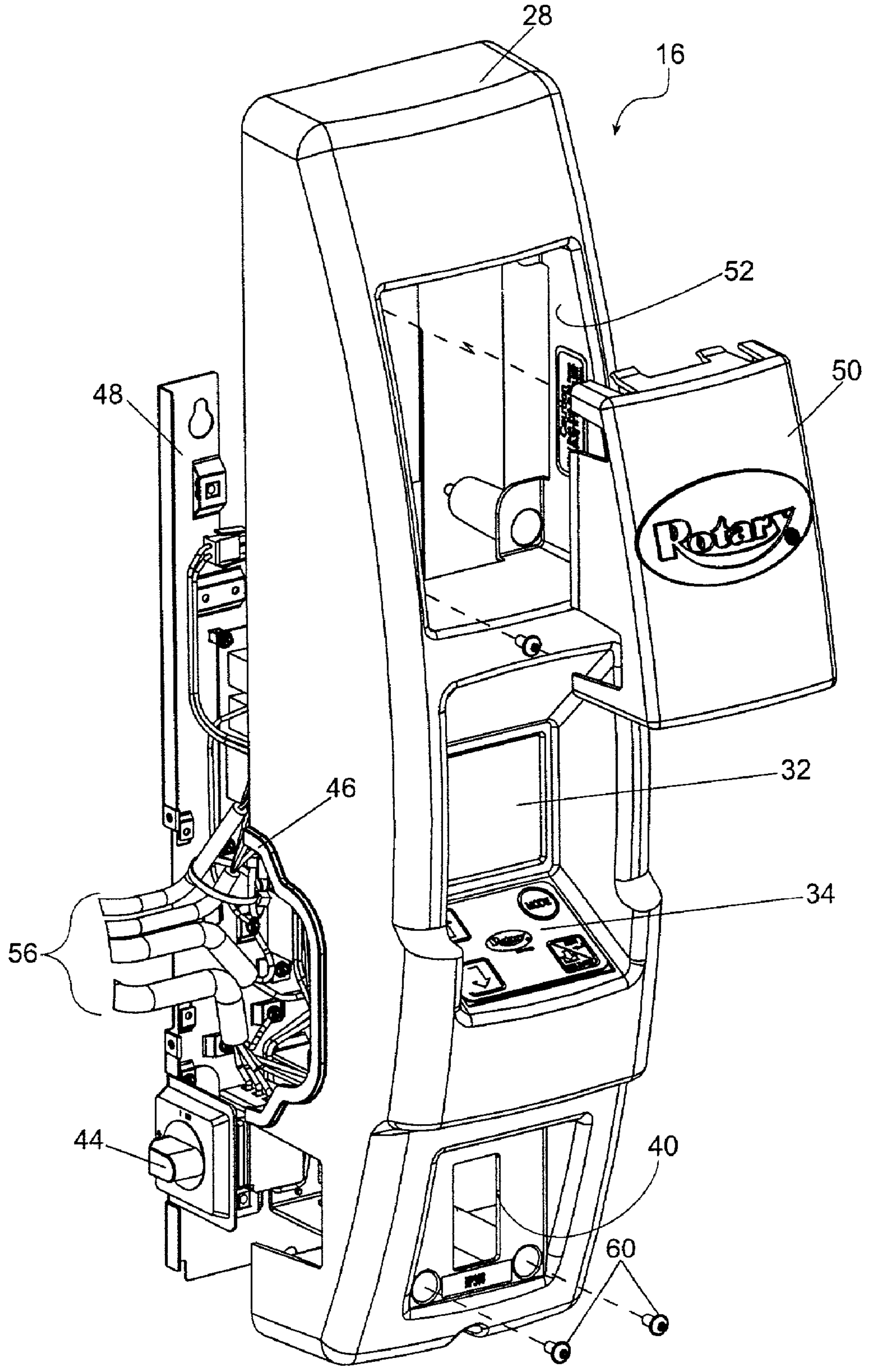
FIG. 6 is a partially exploded perspective view of the control assembly of FIG. 3.

FIG. 6 is a partially exploded perspective view of control assembly 16. Back plate 48 is illustrated spaced slightly behind and aligned with enclosure 28. Access panel 50 is shown exploded out from opening 52. Fasteners 60 secure enclosure 28 to back plate 48.

Figure 7:
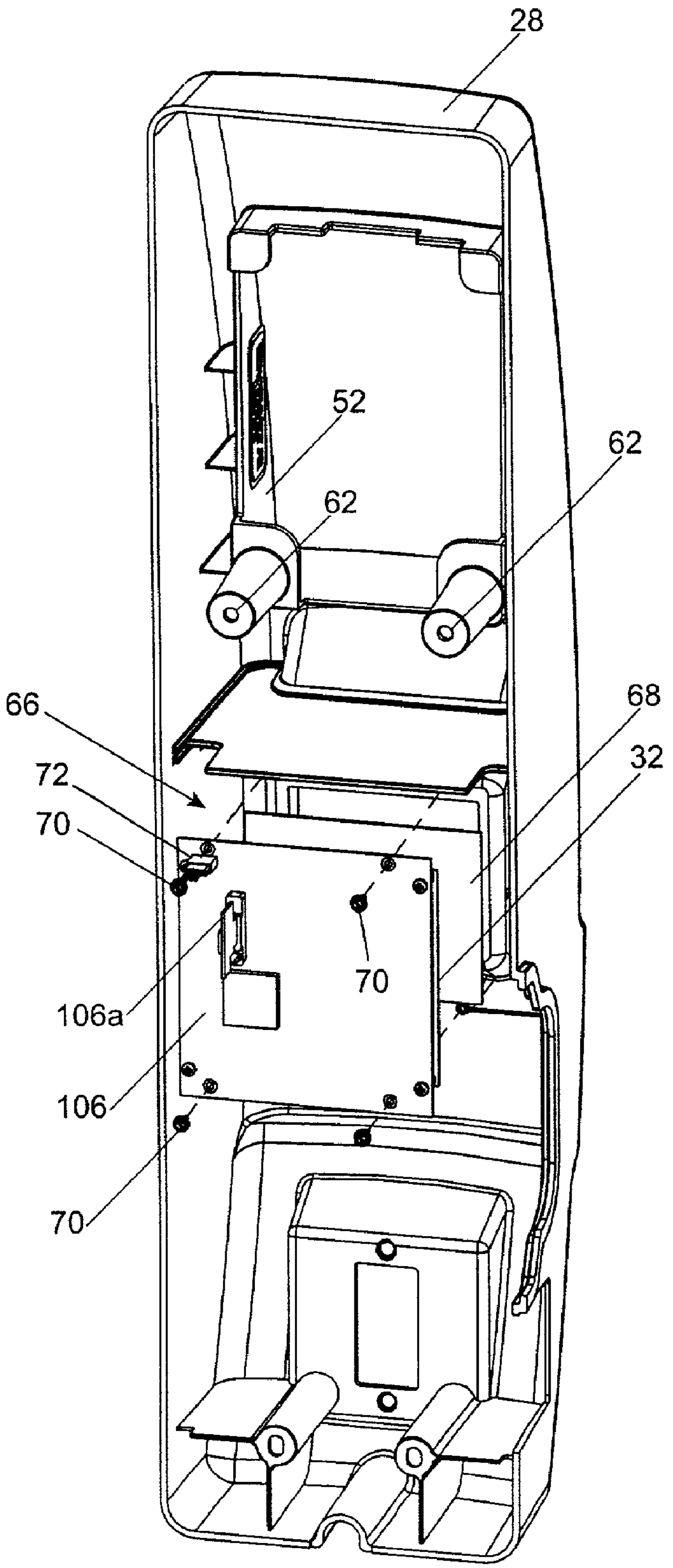
FIG. 7 is a partially exploded perspective view of the rear of the enclosure of the control assembly of FIG. 3.

FIG. 7 is a partially exploded perspective view of the rear of enclosure 28. Mounting holes 62 receive fasteners 60 (FIG. 6) to secure enclosure 28 to back plate 48. Wall 64 physically separates the area which is accessible through access opening 52 from the electrical components which are disposed below wall 64. Assembly 66 is secured to enclosure 28 by fasteners 70.

Figure 7A:
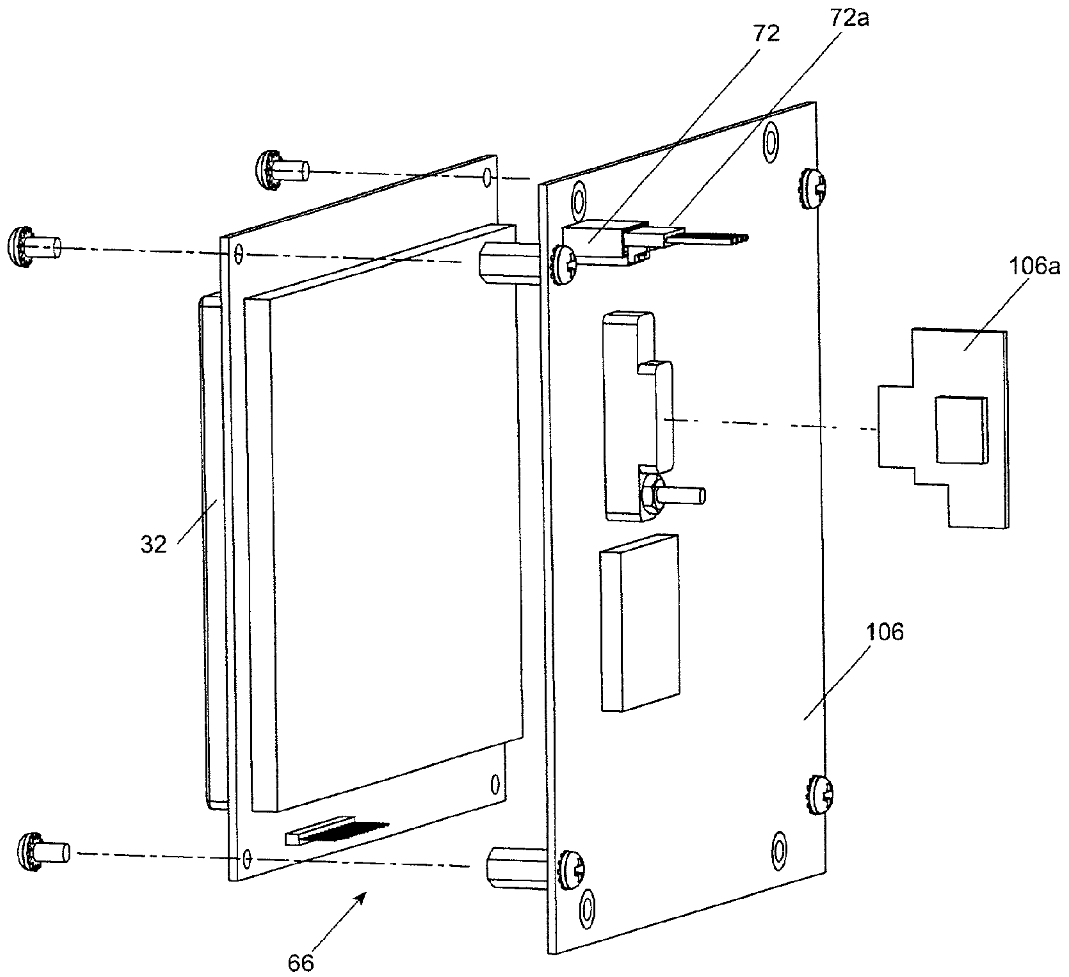
FIG. 7A is an exploded perspective of the display assembly and computer processor board.

Referring also to FIG. 7A, which is an exploded perspective view of assembly 66, assembly 66 includes second computer processor 106, the components which it comprises being carried by a circuit board which is physically separate from the main circuit board which carries first computer processor 104. Assembly also includes display screen 32 and display protective cover 68. Second computer processor 106 is connected to first computer processor 104 (carried by back plate 48, as described below) by cable **72*a* which is plugged into connector 72. Second computer processor 106 carries removable memory module 106*a***.

Figure 8:
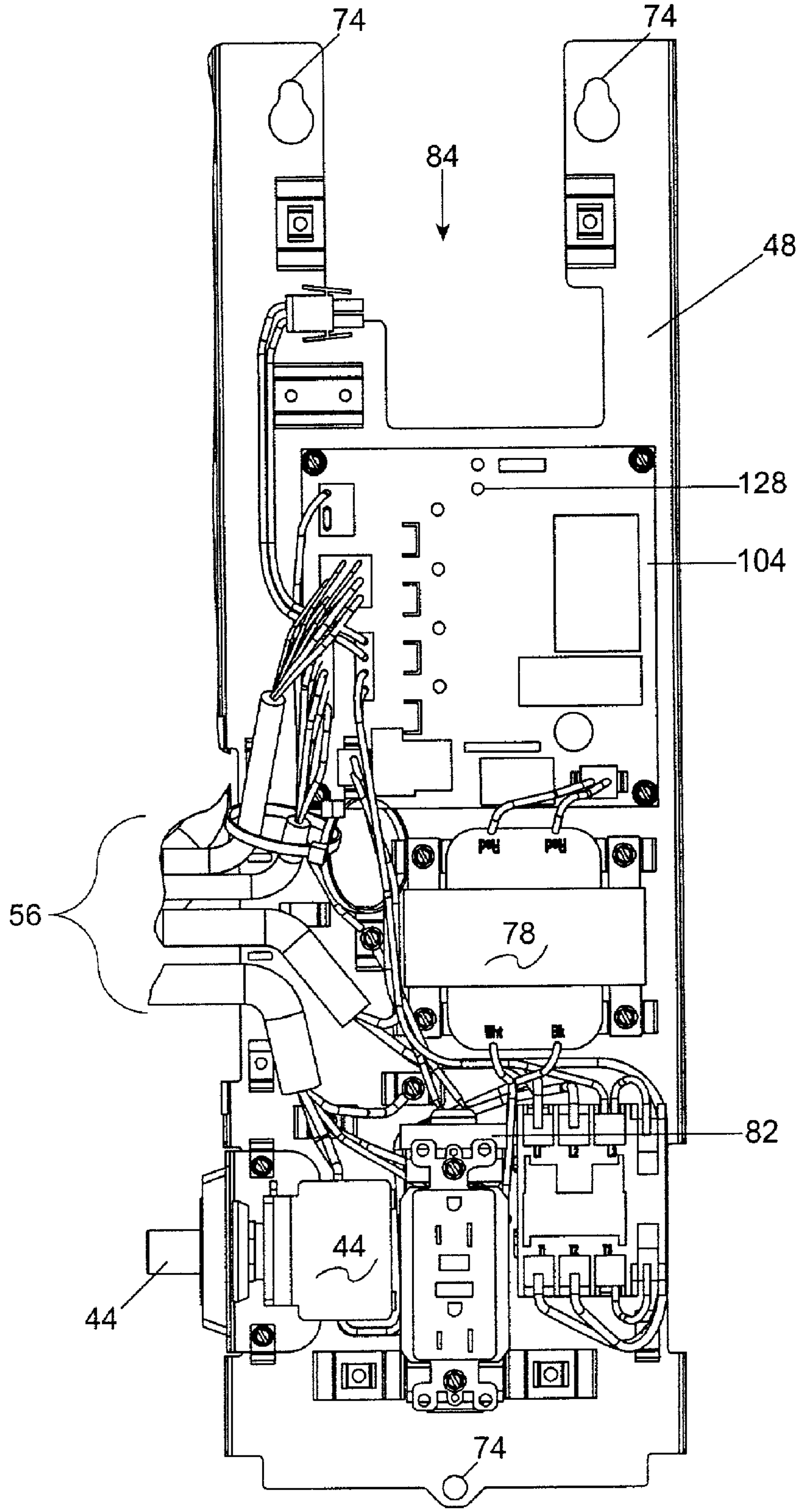
FIG. 8 is a front view of the back plate of the control assembly of FIG. 3.

FIG. 8 is a front view of back plate 48. Back plate 48 includes mounting holes 74 for securing back plate 48 (and control assembly 16) to a lift post or other selected mounting surface. Back plate 48 may be provided with a variety of auxiliary mounting brackets for attaching various components thereto, not all of which are used for each lift model on which control assembly 16 may be used.

In the embodiment depicted, back plate 48 carries all major components of the control except for assembly 66 and key pad 34, including carrying main circuit board 76, which carries first computer processor 104, electrical transformer 78, motor contactor 80 and audible signal sounder 82.

Figure 9:
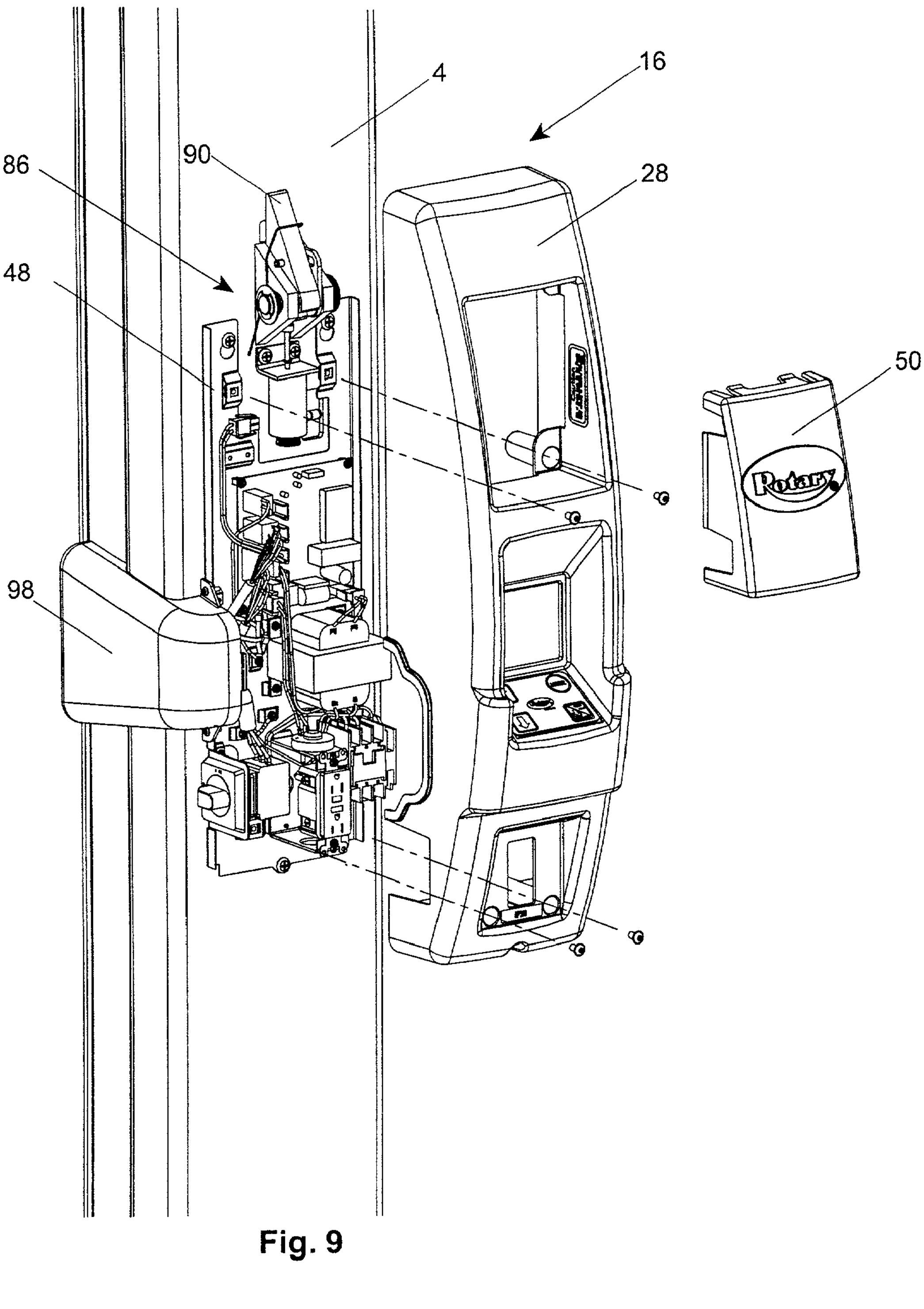
FIG. 9 is a partially exploded perspective view of the control assembly of FIG. 3 illustrating the back plate attached to a vehicle lift post.

Referring now to FIG. 9, there is shown a partially exploded perspective view of control assembly 16, with back plate 48 mounted to post 4. Trough 98 is shown covering any electrical and pneumatic lines, such as illustrated at 56 in FIG. 6.

In the particular embodiment depicted in FIG. 9, post 4 carries locking mechanism 86 which is controlled by solenoid 88. Locking mechanism 86 includes pivoting latch 90 which is normally biased into engagement with a series of vertically aligned windows and steps, resembling a ladder, carried by carriage 7 (not shown in FIG. 9). Engagement of latch 90 with any of the steps prevents the moveable lift engagement structure from lowering beyond that step, thereby providing a positive mechanical lock, preventing downward movement of the vehicle. In order to lower the vehicle intentionally, latch 90 is held in its disengaged position by actuation of solenoid 88.

Solenoid 88 is sufficient for use with two post light duty lifts, with one on each post. Each solenoid must be actuated. However, for other lift applications, such as the two or four post heavy duty lifts, the locking mechanism is actuated pneumatically. Disengagement of the pneumatic locking mechanism is accomplished through actuation of a solenoid operated pneumatic valve (not shown) which is pneumatically connected to each locking mechanism to disengage the latch. The pneumatic solenoid valve may be disposed within enclosure 28, or elsewhere on the lift, so long as the solenoid is electrically connected to the lift control. If the pneumatic solenoid valve is disposed within enclosure 28, pneumatic connections to connect to the pneumatic source and to connect the pneumatic solenoid valve to the latching/locking mechanisms must be provided. In such case, the pneumatic connections may be located internal or external to enclosure 28, such as extending from a side.

In case of power failure or other malfunction, in order to lower the vehicle beyond the discrete increments defined by locking mechanism 86, latch 90 must be manually disengaged. In the embodiment depicted in FIG. 8, back plate 48 is oriented such that latch 90 is disposed within access opening 84 (see FIG. 8). This aligns access opening 52 with latch 90, allowing access thereto by removal of access panel 50.

Figure 10B:
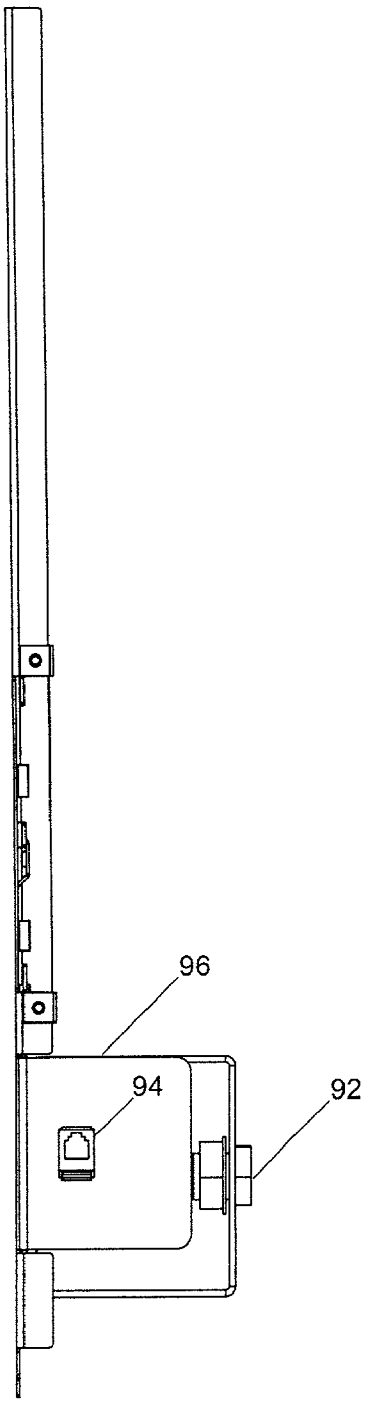
FIGS. 10A and 10B are, respectively, front and side views of the back plate of a slave control illustrating an alternate embodiment including a pneumatic quick disconnect and a communications port
Figure 10A:
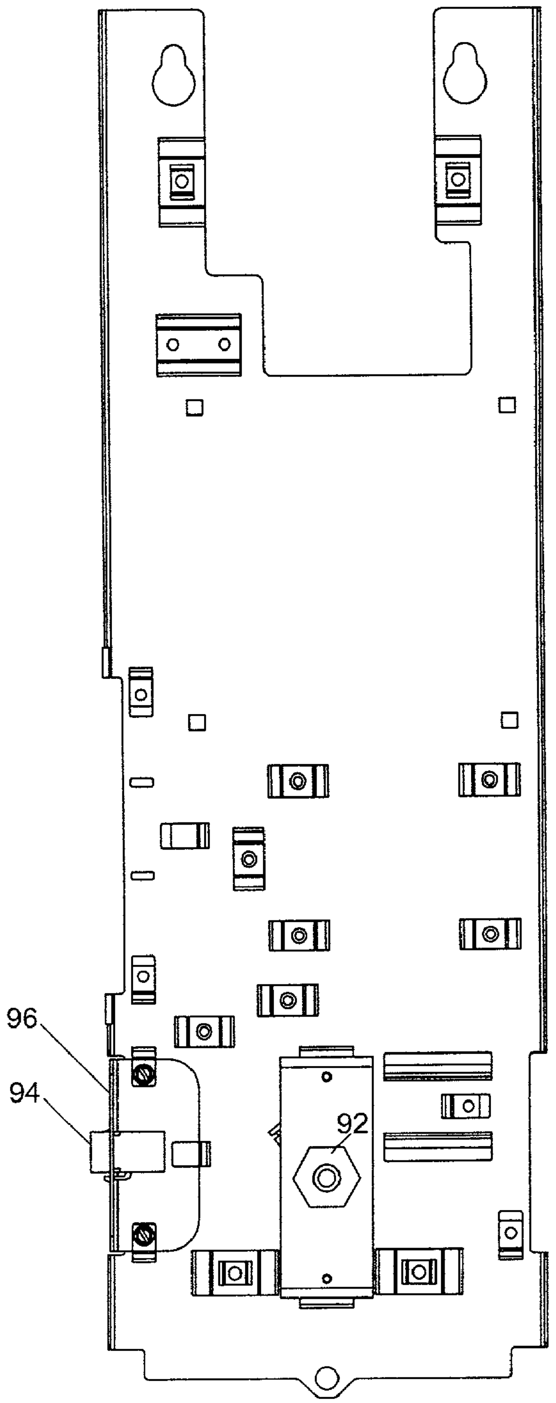

FIGS. 10A and 10B are front and side views of the back plate **48*a* of a slave control assembly 16*a*, described in detail below. A slave control assembly uses the same enclosure 28 as master control assembly 16, but lacks most of the electronic components of master control assembly 16 as seen in FIG. 8, having only a key pad (not shown in FIGS. 10A and 10B) connected by a cable (not shown) to master control assembly 16. A slave control assembly does not have a display screen, having a flat panel in its place in enclosure 28. FIGS. 10A and 10B illustrate an embodiment of back plate 48*a* having pneumatic threaded NPT connector 92 extending through opening 40 in place of electrical outlet 42. A pneumatic source (not shown) is connected to the back side of connector 92 in any suitable manner. Back plate 48*a* also includes a communications port 94 carried by bracket 96 in place of electrical disconnect switch 44. Communications port 94 can simply be connected to a telephone line or a computer communications network, allowing voice or computer connection therethrough. A pneumatic connection and a communication port may be placed in almost any position on either control assembly 16 or slave control assembly 16*a*, in any opening as illustrated in the figures, for example openings 40 or 46, or in openings added to enclosure 28**.

Figure 11:
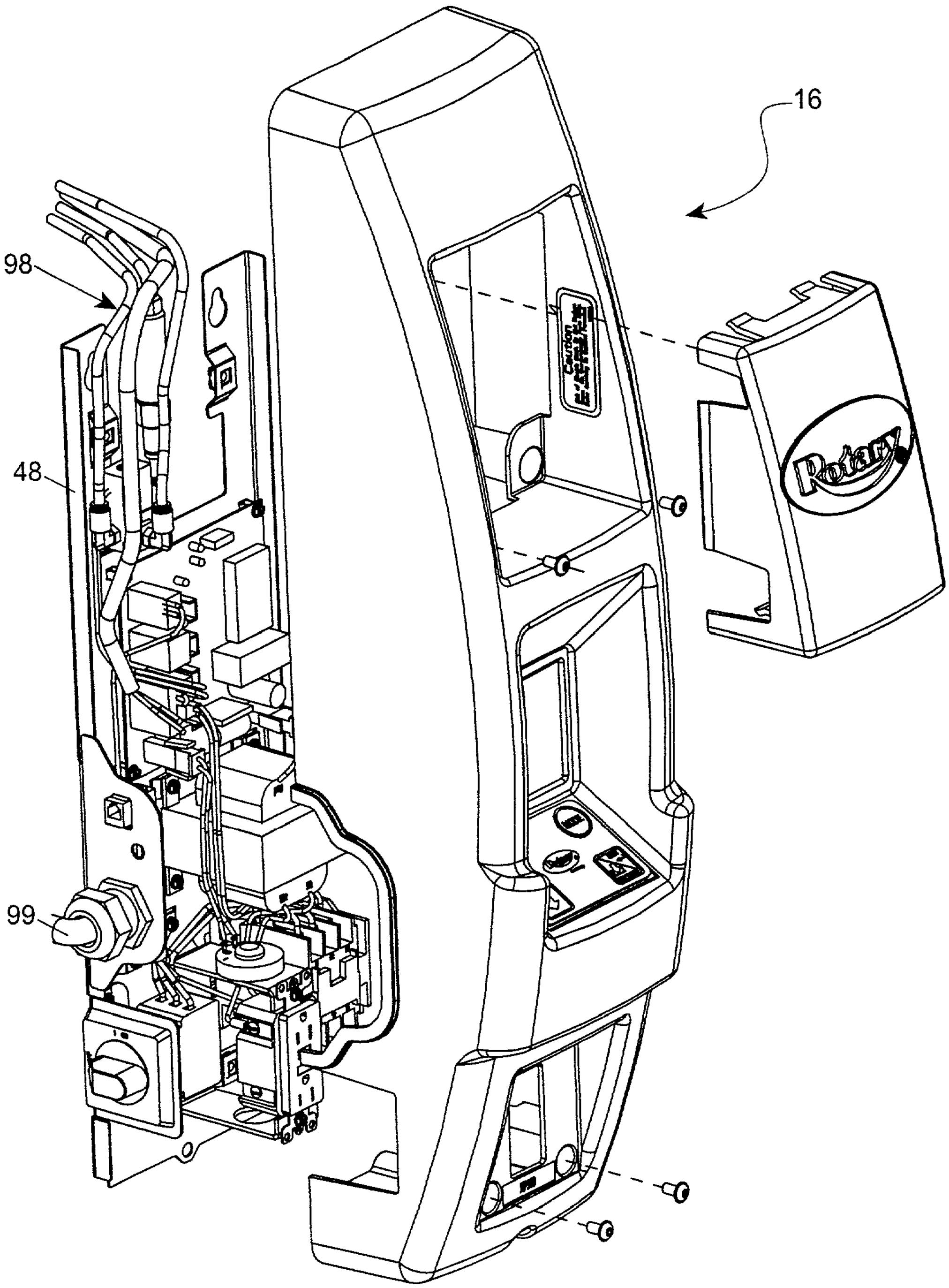
FIG. 11 is a partially exploded perspective view of an alternate embodiment of electrical connections to the control assembly at the back plate.

FIG. 11 illustrates another embodiment configuration of electrical connections to control assembly 16. Bundle 98 includes electrical cables as well as a pneumatic tube, which are illustrated running vertically along and over the top of back plate 48. Electric power is provided by cable 99. This configuration can be used when control assembly 16 is mounted to a wall, a wall bracket or a post, such as are typical for use with inground lifts.

Figure 12:
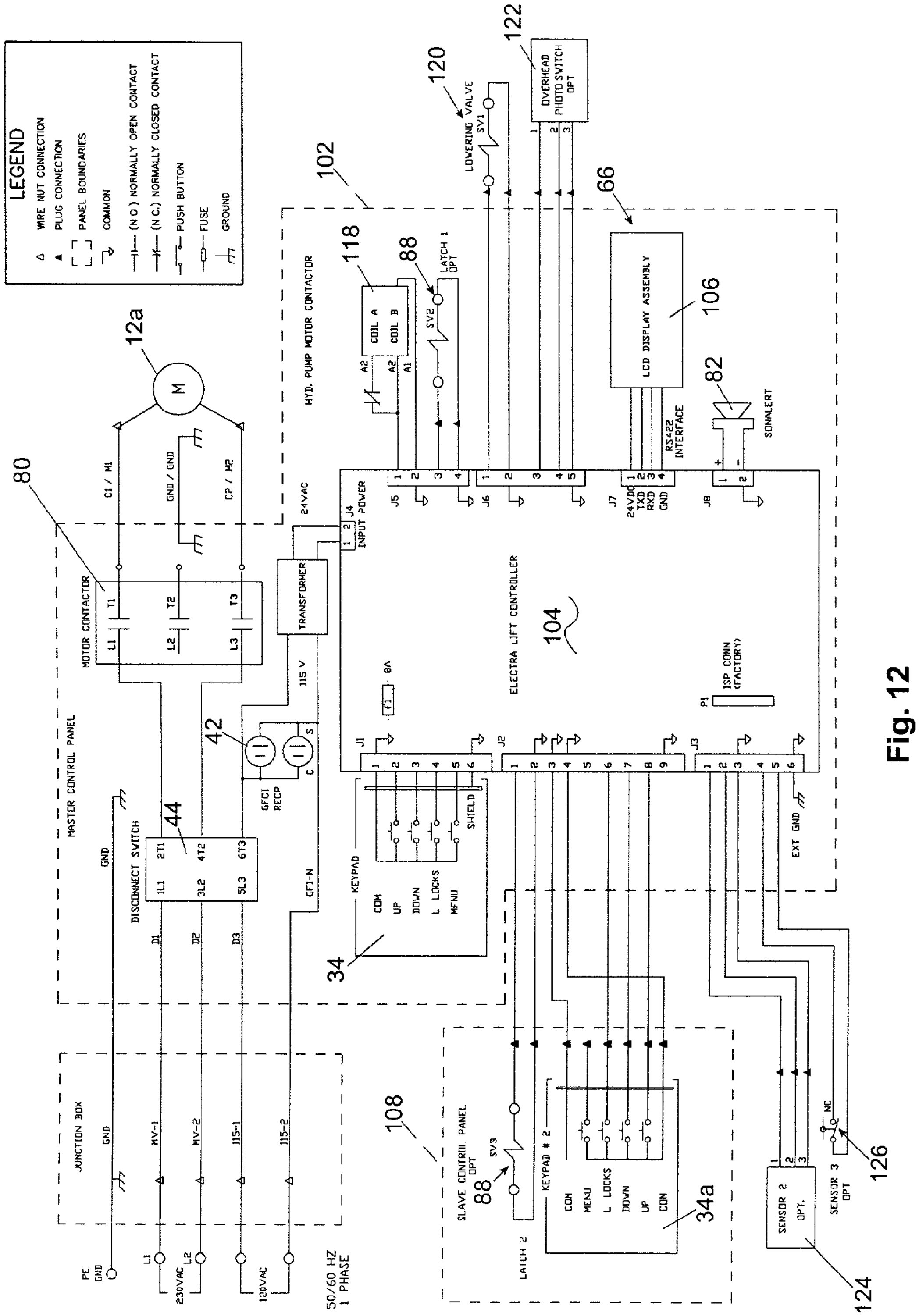
FIG. 12 is a schematic diagram of an embodiment of a control in accordance with the present invention.

Turning now to FIG. 12, there is shown a schematic of one embodiment of control 100. Components of control 100 which, in this embodiment, are part of the master control panel, schematically indicated as dashed line 102, are housed within enclosure 28 of control assembly 16. Control 100 includes first computer processor 104, carried by first printed circuit board 76 (see FIG. 8), which comprises first control logic which configures first computer processor 104 to selectively control the raising and the lowering of the movable lift engagement structure of the vehicle lift. Control 100 also includes second computer processor 106, in this embodiment carried as part of assembly 66, which comprises second control logic which configures second computer processor 106 to enable display of data and which also comprises maintenance control logic, described in detail below. Control 100 also includes motor contactor 80 and key pad 34. Optionally, slave control panel, generally indicated at 108, may be provided, including second key pad **34*a*** but not including a second display screen.

Control 100 receives, generates and transmits a variety of condition signals which are indicative of various respective lift conditions related to the operation of the vehicle lift. As used herein, a signal includes an electric current or electromagnetic field used to convey data or effect an action, including for example, voltage, current, data imposed on a carrier signal and any more advanced signal forms, as well as the simple closing or opening of a switch of an electric circuit.

As illustrated in FIG. 12, key pad 34 is electrically connected to first computer processor 104 and transmits user input thereto as signals. In response to such transmitted user input, in the operation mode, first computer processor 104 selectively controls the raising and lowering of the moveable lift engagement structure.

Figure 13:
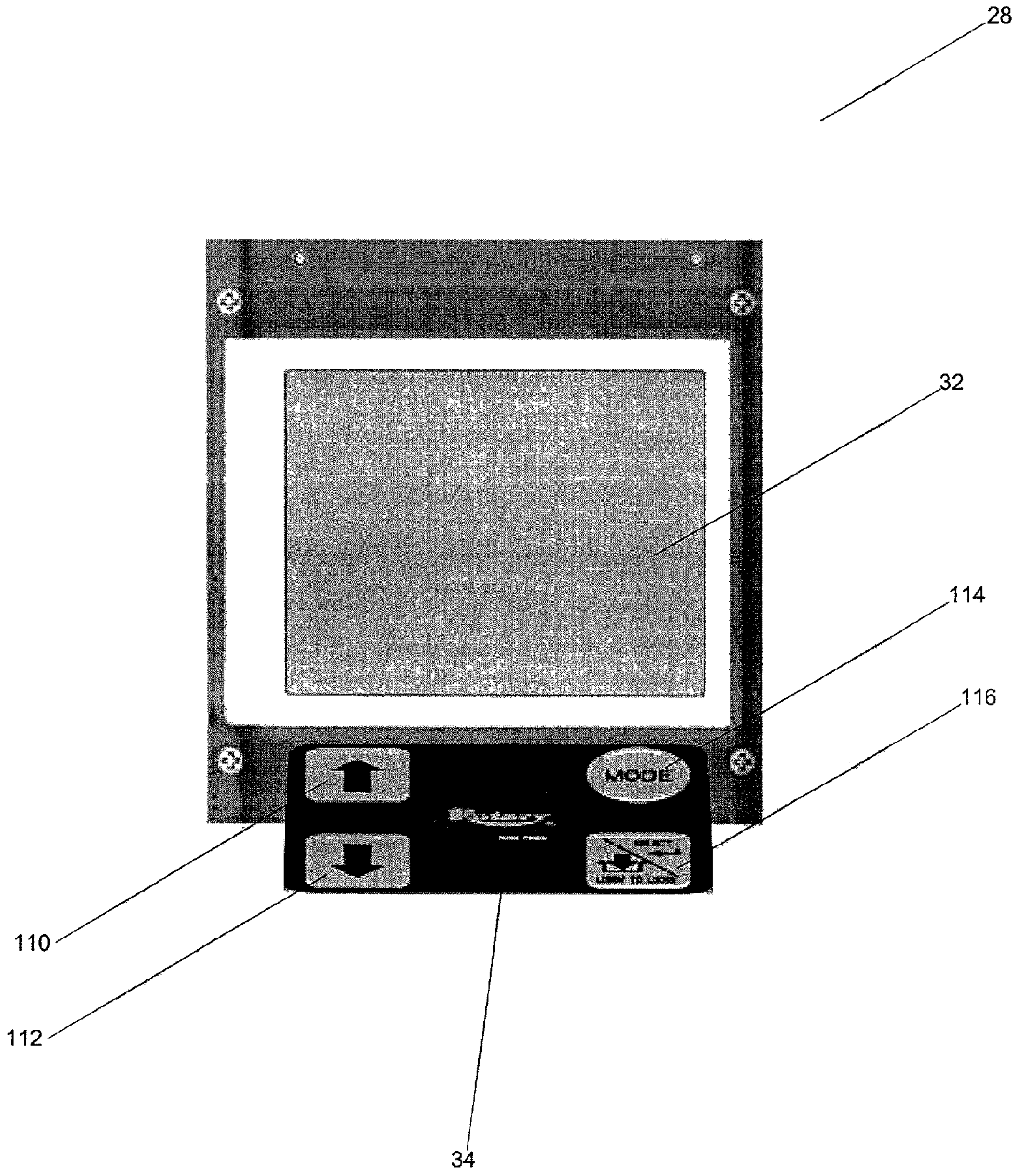
FIG. 13 depicts the display screen and key pad of a control in accordance with the present invention.

Referring now to FIG. 13, there is shown display screen 32 and key pad 34 in their relative positions as carried by enclosure 28 (shown partially transparent). As mentioned above, the depicted embodiment of key pad 34 comprises four electric switches or keys 110, 112, 114 and 116, in the form of momentary contact switches overlaid by a flexible membrane, which are also known as membrane switches. User input is delivered to key pad 34 by depressing the appropriate key or sequence of keys.

In the depicted embodiment, each key 110, 112 and 116 performs more than one function. Which function is performed by each key 110, 112 and 116 depends on which mode of operation of control 100 has been selected or enabled by actuation of key 114. Key 114 is functional to cause control 100 to switch between the operating mode and the information mode, as described below in more detail.

Key 110, which includes up arrow indicia, is functional to cause the moveable lift engagement structure to raise, or to scroll up through a menu displayed on display screen 32 depending on the mode of operation of control 100. While in the operating mode, key 110 is actuated by depressing it, thereby transmitting a signal which enables the control logic of first computer processor 104 to generate a "raise" control signal in response thereto. The "raise" control signal energizes motor contactor coil 118 which closes the contacts of motor contactor 80, providing power to motor **12*a* thereby driving pump 12*b* and raising the moveable lift engagement structure. Vertical position sensors (not shown) could be provided and the user could be allowed to input through a user interface a selected height. Control 100 could then interrupt upward movement of the moveable lift engagement structure once the selected height is reached, despite continued actuation of key 110**. It is noted vertical position sensors could also be used as a continuous position feedback system for individual control of the carriage or yoke.

Once the moveable lift engagement structure has been raised to a desired position, it may be lowered a bit so that latch 90 engages one of a plurality of steps formed between vertically aligned windows (not shown), resembling a ladder, which provides a positive mechanical lock preventing downward movement of the moveable lift engagement structure. Key 116, which includes "lower to lock" and "select" indicia, is functional to cause the moveable lift engagement structure to lower to the locks, or to select a menu option displayed on display screen 32, depending on the mode of control 100. While in the operating mode, actuation of key 116 transmits a signal which enables the control logic of computer processor 104 to generate a lower control signal in response thereto. The lower control signal opens lowering valve 120, which in the depicted embodiment is a solenoid operated valve, allowing the moveable lift engagement structure to lower. Since latch 90 is normally biased toward engagement, the moveable lift engagement structure can travel downwardly a short distance until latch 90 engages the next step.

Key 112, which includes down arrow indicia, is functional to cause the moveable lift engagement structure to lower, or to scroll down through a menu displayed on display screen 32, depending on the mode of control 100. While in the operating mode, key 112 is actuated by depressing it, thereby transmitting a signal which enables the control logic of first computer processor 104 to generate a signal to disengage latches 90 and to generate a "lower" control signal. In the depicted embodiment, latches 90 are held in a disengaged position by actuation of each respective solenoid 88. Alternatively, as described above, latches 90 may be operated pneumatically and disengaged by actuation of a solenoid valve providing pressure to pneumatic cylinders to hold latches 90 in a disengaged position. With latches 90 in the disengaged position, first computer processor 104 generates a "lower" control signal as described above, opening lowering valve 120, thereby lowering the moveable lift engagement structure.

It is noted that when the moveable lift engagement structure is to be lowered from a position at which latches 90 are in engagement with a step, the moveable lift engagement structure first needs to be raised to separate latches 90 from the step to relieve the force. In such a situation, the user will first actuate key 110 to raise the moveable lift engagement structure a distance sufficient to relieve the forces, and the actuate key 112 to lower the moveable lift engagement structure as far as desired. Alternatively, control 100 may be configured to do this automatically in response to actuation of key 112 when starting from the "lowered to locks" position.

Control 100 monitors a variety of lift conditions. As used herein, lift conditions include any condition related to the operation, control or maintenance condition of the lift. Control 100 may monitor some operation conditions through receipt of condition signals from sensors disposed to generate an output signal indicative of the operation condition associated with that sensor. In the depicted embodiment, optical overhead sensor 122 (see FIG. 1, not seen but generally indicated by arrow, and FIG. 12) is disposed to project a generally horizontal beam across lift 2 just under overhead beam 6, to monitor when the top of the vehicle is proximate overhead beam 6. It is noted that the overhead sensor does not have to be optical. Other sensors 124 and 126 are illustrated in FIG. 12. For lifts which so require, sensor 124 may be a slack cable sensor, to monitor whether lift cables are slack. Also, as may be required for a particular lift, sensor 126 is a toe guard switch, to monitor when carriage 8*a* is near the floor.

The number and configuration of such sensors depend on the operation conditions monitored. For example, for inground lifts, a sensor could be provided to monitor the ground water level.

Other condition signals indicative of operation conditions may be monitored by control 100 without the use of sensors. For example, in the depicted embodiment, control 100 monitors the voltage in each driver circuit for the actuators (in the depicted embodiment, motor contactor coil 118, lowering valve 120, and latching mechanisms 86) as well as regulated and unregulated 24 VDC, and VCC 5 volt input.

Of course, control 100 may monitor any operation condition. For example, the following may be monitored: vertical position of moveable lift engagement structure, hydraulic and/or pneumatic pressure, force on arms 8, position of arms 8, position of the vehicle, points on the vehicle, out of level conditions, engagement/disengagement of latching mechanism 86, and wear on key components.

Some operation conditions may be monitored by control 100 only during certain operations, such as monitoring the toe guard sensor only when the lift is being lowered or the overhead sensor when the lift is being raised.

Computer processor 104 stores, in a non-volatile memory (such as an EEPROM), certain information regarding historical operation conditions, referred to herein as usage data, which can be used to track the performance of the lift. In the depicted embodiment, usage data stored by computer processor 104 includes the number of times motor contactor coil 118 has been energized (motor starts), the total time motor contactor coil 118 has been energized (motor on time), the number of times lowering valve 120 solenoid has been energized (lowering starts), the total time lowering valve 120 solenoid has been energized (lowering on time), the maximum length of time that lowering valve 120 solenoid has been energized (max lowering on time), the number of times that latch 90 (solenoid 88 or pneumatic valve solenoid) has been energized (latch starts), the total time latch 90 (solenoid 88 or pneumatic valve solenoid) has been energized (latch on time), the maximum length of time that latch 90 (solenoid 88 or pneumatic valve solenoid) has been energized (max latch on time), the number of times that overhead sensor 122 has been tripped (overhead cycles), and the number of times that toe guard sensor 126 has been tripped (lower sensor cycles).

Monitoring operation conditions involves access to information indicative of the condition being monitored and application of predetermined criteria to that information. Monitoring will result in a defined action if dictated by application of the predetermined criteria. Based on the application of predetermined criteria to the monitored operation conditions, the control logic of computer processor 104 will determine whether an operation fault condition exists, and if so, modify, including inhibit, the operation of the lift from that operation called for by user input, and in certain instances generate an operation fault indication signal which is transmitted to computer processor 106, which, in the depicted embodiment, enables display of operation fault data, i.e., data indicative of the operation fault condition. Additionally, such predetermined criteria can be applied to usage data.

Predetermined criteria applied by the control logic of computer processor 104 to operation conditions monitored through sensors, and the resultant actions by control 100 include, but are not limited to:

1. If a slack cable sensor is present, any time a slack cable is detected all lift and information display functions of control 100 will be inhibited until the slack cable signal is corrected and audible signal sounder 82 will sound. Computer processor 104 stops transmitting signals to computer processor 106 (such as user input from key pad 34). Computer processor 104 may, however, enable the display of operation default data by computer processor 106 indicative of the slack cable condition.
2. If a toe guard switch is present, when the moveable lift engagement structure is being lowered, when the toe guard switch is tripped (indicating the moveable lift engagement structure is proximate the floor, computer processor 104 inhibits further downward movement until key 112 is released and reactuated, after which causes audible signal sounder 82 to beep, as required by certain regulatory bodies. Alternatively, upon tripping of the toe guard switch, computer processor 104 may momentarily pause before continuing the downward movement accompanied by beeps. If the toe guard switch is omitted, beeps may be continuously generated while the lowering valve 120 solenoid is energized (such as by leaving the board connections for sensor 126 open, simulating a tripped toe guard switch).
3. If overhead sensor 122 is tripped and key 110 is actuated, the control logic of computer processor 104 will inhibit further upward movement of the moveable lift engagement structure, and enable the display of operation fault data indicative of the tripped overhead sensor.

Predetermined criteria applied to operation conditions related to actuators, include, but are not limited to:

4. If the motor is supposed to be on, but it is off.
5. If the lowering valve is supposed to be open, but it is closed.
6. If either of the two latching mechanisms is supposed to be disengaged, but is engaged.
7. If the motor is supposed to be off, but it is on.
8. If the lowering valve is supposed to be closed, but it is open.
9. If either of the two latching mechanisms is supposed to be engaged, but is disengaged.

For each of the conditions related to the actuators, computer processor 104 will inhibit further movement of the moveable lift engagement structure, will enable the display of operation fault data indicative of the operation fault condition, and will flash LED indicator 128 (see FIG. 8). The display of operation fault data is enabled by a control signal, the operation fault indication signal, from computer processor 104 to computer processor 106, which recalls the associated operation fault data from the memory module 106*a*. Actuation of key 112 during the display of operation fault data will enable the display of trouble shooting instructions related to the relevant operation fault condition.

In monitoring the operation of motor 12*c*, latches 90 and lowering valve 120, computer processor 104 checks itself for faulty actuator drivers and faulty actuators (in the depicted embodiment, motor contactor coil 118, latch solenoid 88 (or pneumatic valve solenoid), and lowering valve 120 solenoid, although other actuators may be included) by checking the voltage at respective points in voltage divider circuits at each actuator driver output. When an actuator is supposed to be energized, computer processor 104 looks for at least a threshold voltage. If at least the threshold voltage is not present, then either the actuator driver is not delivering the required voltage to the actuator, or the actuator circuit is shorted. To determine whether an actuator is connected, computer processor 104 may also be configured to monitor current at the actuator or actuator driver. Actuator current data could be stored as usage data. When an actuator is not supposed to be energized, computer processor looks for no voltage at the actuator driver.

At power up, control 100 goes through a series of system checks, based on predetermined criteria, examining the status of all inputs and outputs of control 100 to make sure that they are in the correct state. In the depicted embodiment, this function is performed by computer processor 104. Key pad 34 is checked to make sure no inputs are being generated. More specifically, computer processor 104 checks to see if any of keys 110, 112, 114 or 116 are closed. If second key pad 34*a* is present, computer processor 104 sees the corresponding keys 110*a*, 112*a* and 116*a* (not identified, but see 34*a* on FIG. 12) as being in parallel with keys 110, 112 and 116, and are therefore checked at the same time. Key 114*a* (not identified, but see 34*a* on FIG. 12), which corresponds to key 114, is not connected to computer processor 104, preventing changing the mode from slave control assembly 16*a*. The sensors 122, 124 and 126 are checked to make sure that a fault condition is not being indicated. At the same time, computer processor 104 checks for no voltage at the actuator drivers, indicating that no actuators are engaged.

During start up, computer processor 104 checks a specific location in its volatile memory to see if a specific key is stored there. If the specific key is stored there, it indicates that the volatile memory has not properly reset, such as might happen with a power glitch. Computer processor 104 terminates start up, inhibits operation of the lift, and enables the display of data indicative of the improper reset by computer processor 106. If the specific key is not stored in the specific volatile memory location, indicating proper reset, computer processor 104 will write the specific key to the volatile memory location.

After verifying the system status is OK, control 100, which powers up in the operating mode, may be used to control the raising and lowering of the moveable lift engagement structure.

Additionally, at start up computer processor 106 verifies the presence of an operable memory module 106*a*. If it is not found, display 32 will so indicate. Control 100 remains in the operating mode, with keys 110, 112 and 116 remaining functional. However, mode key 114 cannot switch modes to the information mode.

While in the operating mode, upon the transmission of any user input to control 100, such as through key pad 34, which would enable actuation of an actuator, computer processor 104 checks all of the inputs from user interface 31 and all other inputs as at start up to verify that they are in the correct state. Computer processor 104 also energizes all actuator drivers one at a time for a short time, about one millisecond, long enough for computer 104 to check to make sure that at least the threshold voltage is present in the voltage divider circuits at the actuator driver outputs before proceeding, but not long enough to actuate any of the actuators. When the moveable lift engagement structure is being raised or lowered, if there is any inconsistent user input, such as pressing the up and down keys simultaneously, movement of the moveable lift engagement structure will stop until all user input ceases.

Control 100, through computer processor 104, periodically monitors the actuator drivers for the correct state. If an actuator is supposed to be energized, computer processor 104 looks for the threshold voltage at that actuator driver. If an actuator is not supposed to be energized, even when another actuator is actuated, computer processor 104 looks for no voltage at that actuator driver.

The occurrence of operation fault conditions are also communicated to the user independent of whether display screen 32 is operative. To communicate such information, a code of beeps and LED flashes may be used. In the depicted embodiment:

1. Fast, short beeps/LED: Improper reset and/or slack cable failure.
2. Slow 50% duty cycle beeps/constant on LED: Toeguard/overhead limit sensor tripped.
3. One short beep/LED flash, then pause: Motor is supposed to be off, but it is on.
4. Two short beeps/LED flashes, then pause: Lowering valve is supposed to be closed, but it is open.
5. Three short beeps/LED flashes, then pause: One of the two latching mechanisms is supposed to be disengaged, but is engaged.
6. Four short beeps/LED flashes, then pause: The other of the two latching mechanisms is supposed to be disengaged, but is engaged.
7. Five short beeps/LED flashes, then pause: Motor is supposed to be on, but it is off.
8. Six short beeps/LED flashes, then pause: Lowering valve is supposed to be open, but it is closed.
9. Seven short beeps/LED flashes, then pause: One of the two latching mechanisms is supposed to be engaged, but is disengaged.
10. Eight short beeps/LED flashes, then pause: The other of the two latching mechanism is supposed to be engaged, but is disengaged.

Of course, operation fault conditions may be communicated independent of display screen 32 in other ways, such as a recorded or synthesized voice.

In the depicted embodiment, all of the functions which control the operation of the lift (which does not include display of data by display screen 32) while control 100 is in the operating mode, are performed by first processor 104 independent of second processor 106. For example, the control logic is resident on first processor 104; sensors which monitor operation conditions are connected to computer processor 104; operation conditions not monitored through sensors are monitored through computer processor 104; the predetermined criteria on which the generation of an operation fault indication signal is based is resident on first processor 104; operation fault indication signals are generated by computer processor 104; communication of operation fault conditions independent of display screen 32 is done by computer processor 104; computer processor 104 generates the signals which enable second computer processor 106 to enable display of messages corresponding to operation fault conditions on display screen 32; and actuation of audible signal sounder 82 is done by computer processor 104.

Thus, control 100 is configured so that computer processor 104 controls all lift operations regardless whether computer processor 106 is present or functional. By configuring the lift operation control to be resident in a single computer processor and fully operational to control the lift independent of other processors which provide non-lift operation functions, changes may be made to the non-lift operation functions and any associated processors, programming and hardware without affecting or requiring changes to the lift operation control. Since lifts and controls for lift operation are subject to third party certification, this separation of the functions between lift operation control and non-lift operation functions allows changes to be made to the non-lift operation functions without requiring rectification of the lift operation control.

As previously mentioned, control 100, and more specifically computer processor 106 in the embodiment, depicted is also configured to enable display of data, in the depicted embodiment, through display screen 32. In this embodiment, control 100 has two modes, the operating mode, as described above, and the information mode. As previously indicated, control 100 powers up in the operating mode. To switch to the information mode, key 114 is actuated thereby transmitting a "mode" signal which enables computer processor 104 to transmit a signal to computer processor 106. In response to the signal from computer processor 104, computer processor 106 will transmit an appropriate responsive signal to computer processor 104. Upon receipt of the acknowledging responsive signal, computer processor 104 will enter the information mode. The same "handshake" protocol is followed in switching from the information mode to the operating mode.

While in the information mode, key pad 34 is not functional to control the lift operation, although computer processor 104 continues to monitor the operation conditions as described above. In the information mode, computer processor 104 transmits user input from key pad 34 to computer processor 106 to enable display of data in response thereto.

As mentioned above, keys 110, 112 and 116 are each configured to perform at least two functions: One set of functions may be performed while in the operating mode and a second set of functions may be performed while in the information mode. While in the information mode, the selection of data to be displayed is menu driven. In the information mode, display screen 32 displays menu options and keys 110 and 112 are used to scroll up or down through the menu. In this mode, key 116 is functional to select the menu option to which the user has scrolled.

Computer processor 106 is configured to enable display of lift data in response to user input received from key pad 34 via computer processor 104. Lift data as used herein includes any data relevant to the operation or control of the lift. The display of such lift data can include various display techniques to draw attention to or to emphasize desired aspects of the lift data being displayed, such as flashing graphics.

Lift data includes usage data and operation fault data, as described above. Lift data also includes data which instructs the user in regard to the lift (instructional data). Instructional data includes information on how to use the lift (use instruction data), on safety practices and warnings relevant to operation of the lift such as displaying safety decal information (safety data), and on how to troubleshoot operation of the lift (troubleshooting data).

In the depicted embodiment, lift data also includes maintenance data. Maintenance data includes maintenance notice data indicating that a maintenance condition exists and maintenance instruction data which includes information on maintaining the lift.

As mentioned above, computer processor 106 includes maintenance control logic which is operative to generate a maintenance condition indication signal, based on predetermined criteria, which enables display of maintenance data indicative of the maintenance condition. Maintenance conditions include conditions that call for preventative maintenance and conditions that call for repair maintenance.

In the depicted embodiment, the predetermined criteria used to base the generation of a maintenance condition indication signal is based on the passage of time: A specific maintenance condition indication signal is generated when the predetermined time period for that specific maintenance condition has passed. The following table provides examples of predetermined time period criteria for the indicated maintenance condition:

| Maintenance Condition | Time period (days) |
|---|---|
| Check Cables/Sheaves for Wear | 7 |
| Inspect Adapters for Damage | 7 |
| Inspect Pads for Damage | 7 |
| Inspect Front Wheel Stops | 7 |
| Inspect Ramp Chocks | 7 |
| Check Locking Latch Operation | 7 |
| Clean Slip Plate/Radius Gauge | 7 |
| Check Level of Runway | 30 |
| Lube Turning Radius Guide | 30 |
| Check Equalizer Tension | 30 |
| Lubricate Guide Barrel(s) | 30 |
| Check All Bolts for Tightness | 60 |
| Check Anchor Bolt Tightness | 90 |
| Check Power Unit Fluid Level | 180 |

These time periods are purely illustrative. In this example, reminders for daily maintenance conditions (i.e., maintenance conditions that should be addressed daily) are set at 7 days, rather than daily. The weekly reminder may include an indication that the maintenance needs to be performed daily. Not all of the maintenance conditions listed in this table applies to all lift types. Additionally, different time periods may also apply for different lift types. The user selects the lift type in the information mode, which identifies the predetermined criteria applicable to the particular lift type. Lift type is also relevant to whether the latches 90 are mechanically operated by solenoid 88 or whether a solenoid operated pneumatic valve is used, so the proper actuation voltage is applied by the associated actuator driver.

As used herein, predetermined criteria, as related to maintenance conditions, includes criteria based on solely on the passage of a period of time, as well as criteria based on varying parameters related to the operation or environment of the lift, such as usage data. Such predetermined criteria includes, for example, algorithms which correlate usage data to the maintenance requirements of the lift as may be empirically developed. Additionally, such predetermined criteria may be based on operation fault data.

Upon generation of a maintenance condition indication signal, accompanied by display of the maintenance notice data, the user may either actuate the "select" key 116, which will then enable display of maintenance instruction data regarding that maintenance condition, or actuate the mode key 114, which will place control 100 in the operating mode. The maintenance condition may be reset at the appropriate display by input from the user through key pad 34, preferably only after the indicated maintenance has been performed. The maintenance notice data will be displayed once a day, for example in the morning when the lift has been powered up for the day. Each subsequent day after the initial display of the maintenance notice data, if the maintenance condition has not been reset, the display will indict the number of days the maintenance condition has been passed due. Alternatively, display of the maintenance notice data may be scheduled for a particular time of the day, which is particularly beneficial in case control 100 is left on overnight.

Control 100 includes time management functions. Control 100, through computer processor 106, includes a timer function which displays lapsed time on display screen 32 in all operation modes. The timer may be started and stopped by actuating the appropriate key while in the information mode. Alternatively, the time may be started automatically upon placing a vehicle on the lift and/or raising the lift. Control 100 also includes and displays date and time information, and an alarm which can be set to beep at a preset time on a one time or daily basis.

In addition to lift data, computer processor 106 is configured to enable display of vehicle lift point data, which is data indicating the location of the proper lift points for a vehicle. In depicted embodiment, vehicle lift point data is available for most vehicles less than twenty years old. In this embodiment, vehicle lift points are displayed in conjunction with a graphical representation of the vehicle.

While in the depicted embodiment, selection of vehicle lift point data displayed is done by user input to key pad 34, the display of vehicle lift point may be enabled in other ways. For example, data on the type of vehicle may be scanned, or transmitted by an RF or IR transmitter on the vehicle.

Control 100 may also be configured to display and receive various other data. Computer processor 106 may be configured to display service data regarding the vehicle. Service data includes any data relevant to performing service on the vehicle, such as instructions on servicing, service bulletins, specifications, time required for defined service, parts list, etc. Service data may include data about the service history of the specific vehicle. Control 100 may be configured to order parts based on input from the user from the facility's parts department, or even order directly from a parts supplier, with an appropriate communications connection, described below. Control 100 may be configured to keep track of the service performed and interface with an iqinvoicing system.

Control 100 may be configured to receive information identifying the user, such as through key pad 34, through a card reader or any means, and to keep track of the user's time spent on the particular job. Control 100 may further be configured to require input of an authorized user identification before the lift may be operated.

Lift data is stored in a non-volatile electronic memory. Such electronic memory may be a physical storage device such as a hard drive, tape drive, etc. Such electronic memory may also be a memory module, such as an EEPROM, or the like. In the depicted embodiment, usage data, as well as the predetermined criteria for operation conditions and lift type information are stored in a non-volatile memory of computer processor 104.

Instructional data and maintenance data are stored in memory module 106*a* carried by computer processor 106. The predetermined criteria related to maintenance conditions is also stored in a memory associated with computer processor 106. This allows changes to these data and criteria to be made without affecting any aspect of computer processor 104.

Any other data displayable by control 100 is also stored in a memory.

Figure 14:
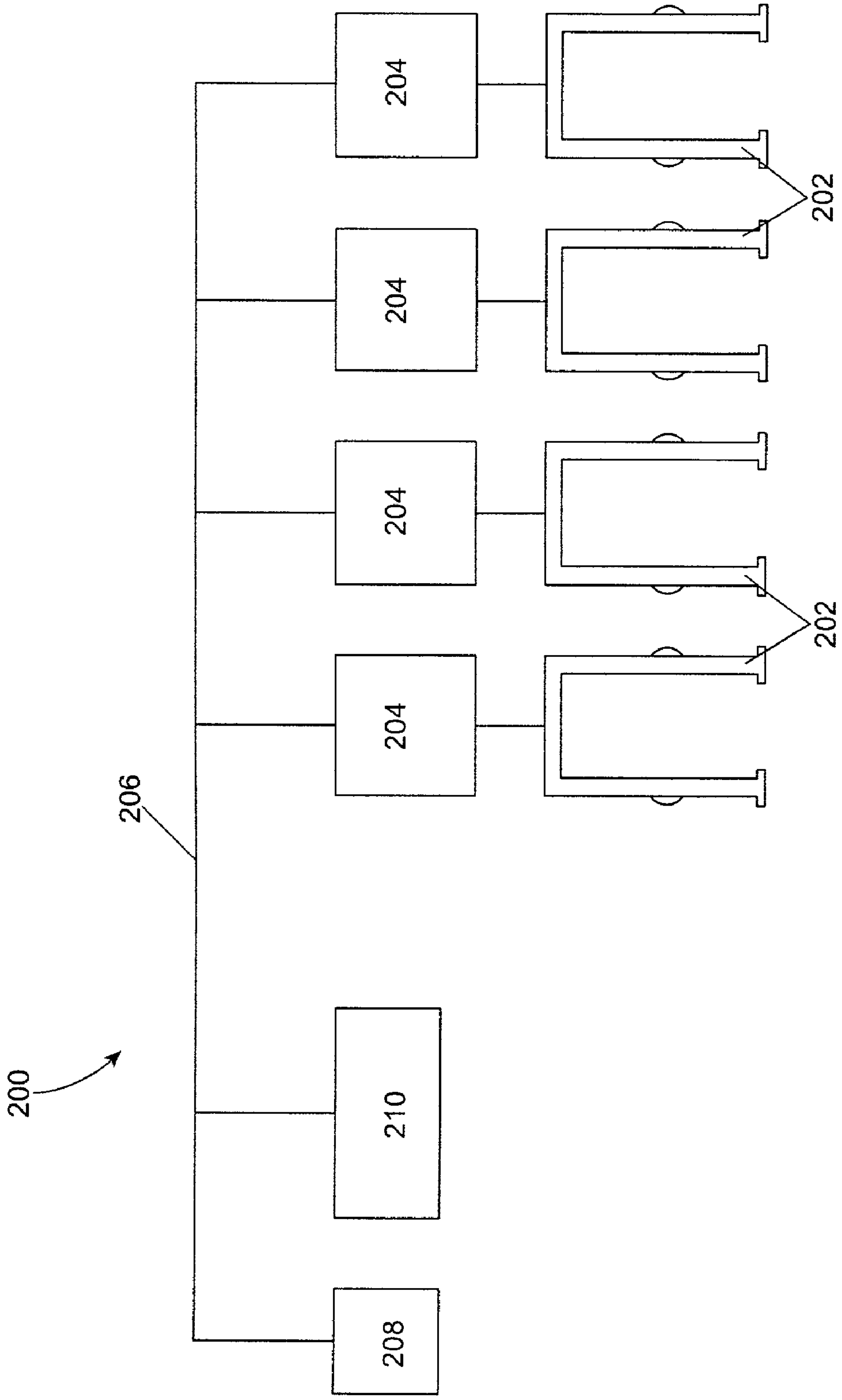
FIG. 14 is diagrammatic illustration of a vehicle service system which includes a plurality of vehicle lifts in accordance with the present invention.

Referring now to FIG. 14, there is diagrammatically shown vehicle service system 200 which includes a plurality of vehicle lifts 202, with each vehicle lift 202 having a moveable lift engagement structure (not shown in FIG. 14) and an associated electronic control 204. Each electronic control 204 includes control logic configured to selectively control the raising and the lowering of the movable lift engagement structure of that vehicle lift, as described above. Each control 204 is connected to computer communication network 206. Also connected to computer communication network 206 is central memory 208 and central computer processor 210. Alternatively, central memory 208 may be connected to network 206 by being connected directly to central computer processor 210.

The functions performed by computer processor 106 described above are performed for the plurality of lifts by central computer processor 210 and memory 208. User input from the respective user interfaces (not shown in FIG. 14) are transmitted by the respective lift controls 204 over network 206 to central computer processor 210, which responds by transmitting the appropriate data or response to the respective lift control 204. Operation fault indication signals, as described above, are generated as appropriate by the respective lift controls 204 and transmitted over network 206 to central computer processor 210, enabling display of operation fault data. Central computer processor 210 responds by transmitting the appropriate operation fault data to the respective lift control 204 for display local at the associated vehicle lift 202.

Operation fault data, instructional data and maintenance data are stored in memory 208, as may be vehicle lift point data. Central computer processor 210 includes the maintenance control logic which, as described above, is operative to generate a maintenance condition indication signal, based on predetermined criteria, which enables display of maintenance data indicative of the maintenance condition. The predetermined criteria related to maintenance conditions is applied by central computer processor 201. For predetermined criteria based on usage data, central computer processor 210 "looks" at the respective usage data collected by the respective control 204. As with computer processor 106 as described above, storing the predetermined criteria in memory 208 provides greater flexibility to revising the criteria. By centralizing the data in memory 208, implementing revisions for all lifts is simpler. For example, revisions could be downloaded from the internet or other external communication.

Alternatively, central computer processor 210 may be omitted, with memory 208 providing common memory storage of data and maintenance control logic for the second computer processors (corresponding to computer processor 106 as described above) of all lift controls 204. This provides the advantages of a central memory.

Although as described above, the lift controls 204 networked to vehicle service system 200 all maintain the operation control logic locally (e.g., each has a respective first computer processor corresponding to computer processor 104 as described above), which is preferable, alternatively the operation control logic could be centrally located, with inputs and outputs being communicated over the network and with the user remaining local at the associated lift. Sensor outputs could be delivered over the network, while actuators could remain driven locally upon appropriate signal from the central computer processor 210.

Other equipment may be connected to network 206. For example, in addition to lift controls 204, equipment and tools which are suitable for use in servicing a vehicle or with a vehicle service system may be fitted with an electronic control appropriate for that tool and connected to the network.

Other computer systems could be connected to network 206, or network 206 could be part of or connected to a larger computer communication network to which other computer systems are connected. Such other computer systems could include for example parts ordering system, accounting/billing system, scheduling systems, etc. The network could be connected to other networks, such as the internet, for various reasons, such as to place parts orders or to download service data.

In summary, numerous benefits have been described which result from employing the concepts of the invention. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A vehicle lift comprising:

a. a moveable lift engagement structure; and b. a control comprising:

i) a first computer processor configured to selectively control raising and lowering said moveable lift engagement structure in response to user input; and ii) a second computer processor configured to enable display of lift data.

2. The vehicle lift of claim 1 wherein said second computer processor is further configured to enable display of vehicle lift point data.

3. The vehicle lift of claim 2 wherein display of vehicle lift point data is enabled in response to user input.

4. The vehicle lift of claim 1 wherein selection of specific lift data enabled for display is based on user input.

5. The vehicle lift of claim 4 wherein input of user input is menu driven.

6. The vehicle lift of claim 1 wherein said first computer processor comprises control logic which is configured to modify operation of said lift, from the operation called for by said user input, based upon predetermined criteria applied to one or more operation conditions.

7. The vehicle lift of claim 6 wherein said control is configured to monitor operation conditions and to determine whether an operation fault condition exists based on the application of predetermined criteria to said operation conditions, and said control logic is configured to generate a signal indicative of an operation fault condition.

8. The vehicle lift of claim 7 wherein display of lift data indicative of said operation fault condition is enabled in response to generation of said signal.

9. The vehicle lift of claim 1 wherein said control is configured to receive a plurality of condition signals, each of said plurality of condition signals being respectively indicative of at least one of a plurality of lift conditions.

10. The vehicle lift of claim 9 wherein at least one of said condition signals is generated by a sensor.

11. The vehicle lift of claim 9 wherein said first computer processor is configured to receive said condition signals.

12. The vehicle lift of claim 11 wherein said first computer processor is configured to transmit said condition signals to said second computer processor.

13. The vehicle lift of claim 9 wherein said control further comprises control logic configured to process usage data and generate a signal indicative of a maintenance condition when predetermined criteria is met by said usage data.

14. The vehicle lift of claim 13 wherein display of lift data indicative of said maintenance condition is enabled in response to generation of said signal.

15. The vehicle lift of claim 13 wherein said control logic is executed independent of said first computer processor.

16. The vehicle lift of claim 1 wherein said lift data is stored in at least one electronic memory.

17. The vehicle lift of claim 16 wherein said electronic memory is a physical storage device.

18. The vehicle lift of claim 16 wherein said electronic memory comprises a memory module.

19. The vehicle lift of claim 18 wherein at least a portion of said lift data is stored in said memory module, and said memory module is carried by a circuit board which does not carry said first computer processor.

20. The vehicle lift of claim 1 further comprising a user interface configured to transmit user input to said control.

21. The vehicle lift of claim 20 further comprising a second user interface.

22. The vehicle lift of claim 20 wherein said user interface comprises a key pad.

23. The vehicle lift of claim 22 wherein said key pad is connected to said first computer processor.

24. The vehicle lift of claim 20 wherein said user interface is configured to selectively generate a signal upon certain user input which causes said first computer processor to raise or lower said moveable lift engagement structure in response to said user input transmitted by said user interface to said control.

25. The vehicle lift of claim 20 wherein said user interface is configured to selectively generate a signal in response to said user input transmitted by said user interface to said control, said signal causing said second computer processor to enable display of lift data.

26. The vehicle lift of claim 1 wherein said control is configured to determine whether a maintenance condition exists, and said control further comprises control logic configured to generate a signal indicative of a maintenance condition.

27. The vehicle lift of claim 26 wherein predetermined criteria is applied to usage data to determine whether a maintenance condition exists.

28. The vehicle lift of claim 26 wherein said control is configured to access predetermined criteria stored in a memory located remote to said vehicle lift through a network.

29. The vehicle lift of claim 26 wherein display of lift data indicative of said maintenance condition is enabled in response to generation of said signal.

30. The vehicle lift of claim 29 wherein said lift data indicative of said maintenance condition comprises maintenance data.

31. The vehicle lift of claim 26 wherein said determination of whether a maintenance condition exists is based upon predetermined criteria, said predetermined criteria being based on the passage of time.

32. The vehicle lift of claim 26 wherein said control logic is executed independent of said first computer processor.

33. The vehicle lift of claim 1 wherein said control further comprises a timer.

34. The vehicle lift of claim 33 wherein said timer is controlled by user input.

35. The vehicle lift of claim 1 wherein said control is configured to communicate lift data through a network to a third computer processor which is disposed remote to said control.

36. The vehicle lift of claim 1 wherein said control is configured to access another computer system through a network.

37. The vehicle lift of claim 1 wherein said control is configured to access service data, said service data being stored in a remote database accessed through a network.

38. The vehicle lift of claim 1 wherein said control is configured to enable display of service data.

39. A vehicle lift comprising:

a. a moveable lift engagement structure; and b. an electronic control configured to selectively control raising and lowering said moveable lift engagement structure based upon user input and configured to enable display of lift data regarding use of said lift.

40. The vehicle lift of claim 39 wherein said electronic control is further configured to enable display of vehicle lift point data in response to user input.

41. The vehicle lift of claim 40 wherein display of vehicle lift point data is enabled in response to user input.

42. The vehicle lift of claim 39 wherein selection of specific lift data enabled for display is based on user input.

43. The vehicle lift of claim 42 wherein input of user input is menu driven.

44. The vehicle lift of claim 39 wherein said electronic control is configured to monitor operation conditions, and comprises control logic which is configured to modify operation of said lift, from the operation called for by said user input, based upon predetermined criteria applied to one or more operation conditions.

45. The vehicle lift of claim 44 wherein said control logic is configured to generate a signal indicative of an operation fault condition based upon said predetermined criteria.

46. The vehicle lift of claim 45 wherein display of lift data indicative of said operation fault condition is enabled in response to generation of said signal.

47. The vehicle lift of claim 39 wherein said control is configured to receive a plurality of condition signals, each of said plurality of condition signals being respectively indicative of at least one of a plurality of lift conditions.

48. The vehicle lift of claim 47 wherein at least one of said condition signals is generated by a sensor.

49. The vehicle lift of claim 47 wherein said electronic control further comprises control logic configured to process usage data and generate a signal when predetermined criteria is met by said usage data.

50. The vehicle lift of claim 49 wherein display of lift data indicative of said maintenance condition is enabled in response to generation of said signal.

51. The vehicle lift of claim 39 wherein said lift data is stored in at least one electronic memory.

52. The vehicle lift of claim 51 wherein said electronic memory is a physical storage device.

53. The vehicle lift of claim 51 wherein said electronic memory comprises a memory module.

54. The vehicle lift of claim 53 wherein said memory module is removable from said electronic control.

55. The vehicle lift of claim 39 further comprising a user interface configured to transmit user input to said electronic control.

56. The vehicle lift of claim 55 further comprising a second user interface configured to transmit user input to said electronic control.

57. The vehicle lift of claim 55 wherein said user interface comprises a key pad.

58. The vehicle lift of claim 55 wherein said user interface is configured to selectively generate a signal which causes said electronic control to raise or lower said moveable lift engagement structure in response to said user input transmitted by said user interface to said electronic control.

59. The vehicle lift of claim 55 wherein said user interface is configured to selectively generate a signal in response to said user input transmitted by said user interface to said electronic control which causes said electronic control to enable display of lift data.

60. The vehicle lift of claim 39 wherein said control is configured to determine whether a maintenance condition exists, and said electronic control further comprises control logic operative to generate a signal indicative of a maintenance condition.

61. The vehicle lift of claim 60 wherein predetermined criteria is applied to lift data to determine whether a maintenance condition exists.

62. The vehicle lift of claim 60 wherein said control is configured to access predetermined criteria stored in a memory located remote to said vehicle lift through a network.

63. The vehicle lift of claim 60 wherein display of lift data indicative of said maintenance condition is enabled in response to generation of said signal.

64. The vehicle lift of claim 63 wherein said lift data indicative of said maintenance condition comprises maintenance data.

65. The vehicle lift of claim 60 wherein determination of whether a maintenance condition exists is based upon predetermined criteria, said predetermined criteria being based on the passage of time.

66. The vehicle lift of claim 39 wherein said control further comprises a timer.

67. The vehicle lift of claim 39 wherein said control is configured to communicate lift data through a network to a third computer processor which is disposed remote to said control.

68. The vehicle lift of claim 39 wherein said control is configured to access another computer system through a network.

69. The vehicle lift of claim 39 wherein said control is configured to access service data, said service data being stored in a remote database accessed through a network.

70. The vehicle lift of claim 39 wherein said control is configured to enable display of service data.

71. A vehicle lift comprising:

a. a moveable lift engagement structure; and b. an electronic control comprising control logic operative to generate a signal indicative of a maintenance condition based upon predetermined criteria.

72. The vehicle lift of claim 71 wherein said electronic control is configured to enable display of maintenance data indicative of said maintenance condition in response to generation of said signal.

73. The vehicle lift of claim 71 wherein said predetermined criteria is based on the passage of time.

74. The vehicle lift of claim 71 wherein said control is configured to receive a plurality of condition signals, each of said plurality of condition signals being respectively indicative of at least one of a plurality of lift conditions.

75. The vehicle lift of claim 71 wherein generation of said signal is based upon said predetermined criteria applied to usage data.

76. The vehicle lift of claim 71, wherein said electronic control is configured to inhibit movement of said moveable lift engagement structure if a predetermined maintenance condition exists.

77. The vehicle lift of claim 76, wherein said control is configured to determine whether a predetermined maintenance condition exists, and said electronic control is configured to permit movement of said moveable lift structure in response to user input inputted after movement has been inhibited in response to the existence of a predetermined maintenance condition.

78. The vehicle lift of claim 71 wherein said control is configured to access said predetermined criteria stored in a memory located remote to said control through a network.

79. A vehicle lift for use in servicing a vehicle, said vehicle lift comprising:

a. a moveable lift engagement structure; and b. an electronic display configured to enable display of lift data.

80. The vehicle lift of claim 79 wherein display of lift data is enabled in response to user input.

81. The vehicle lift of claim 79 wherein said electronic display is further configured to enable display of vehicle lift point data.

82. The vehicle lift of claim 81 wherein display of vehicle lift point data is enabled in response to user input.

83. The vehicle lift of claim 79 wherein said electronic display is further configured to enable display of service data.

84. A vehicle lift comprising:

a. a moveable lift engagement structure; and b. an electronic control configured to monitor operation conditions, and to determine whether an operation fault condition exists based on the application of predetermined criteria to said operation conditions, and comprising control logic configured to control the raising and lowering of said moveable lift engagement structure in response to whether an operation fault condition has been determined to exist.

85. The vehicle lift of claim 84 wherein said electronic control is configured to generate a signal indicative of said operation fault condition.

86. The vehicle lift of claim 85 wherein said control is configured to display lift data indicative of said operation fault condition in response to generation of said signal.

87. A vehicle lift comprising:

a. a moveable lift engagement structure;

b. a control configured to raise said moveable lift engagement structure in response to a first signal and to lower said moveable lift engagement structure in response to a second signal; and c. a user interface comprising:

i) a first electric switch configured to enable generation of said first signal;

ii) a second electric switch configured to enable generation of said second signal; and iii) a third electric switch configured to selectively enable operation of said first and second electric switches.

88. The vehicle lift of claim 87 further comprising:

a. a latch having an engaged position in which said latch prevents lowering of said moveable lift engagement structure, and a disengaged position in which said latch does not prevent lowering of said moveable lift engagement structure; and b. a fourth electric switch configured to enable generation of said second signal and to generate a third control signal to enable disposing said latch in said disengaged position.

89. The vehicle lift of claim 87, wherein said control is configured to enable display of lift data, and said first and second switches are enabled in response to activation of said third switch to control selection of lift data enabled to be displayed.

90. The vehicle lift of claim 89 wherein selection of specific lift data enabled for display is menu driven.

91. The vehicle lift of claim 87 wherein at least one of said first, second and third electric switches comprises locations on a touch screen.

92. A vehicle lift comprising:

a. a moveable lift engagement structure;

b. a control configured to raise said moveable lift engagement structure in response to a first signal and to lower said moveable lift engagement structure in response to a second signal; and c. a user interface comprising:

i) a first electric switch configured to perform at least a first and second function, said first function being to enable generation of said first signal;

ii) a second electric switch configured to perform at least a first and second function, said first function being to enable generation of said second signal; and iii) a third electric switch configured to selectively enable said first and second switches to perform said respective first functions.

93. The vehicle lift of claim 92 further comprising:

a. a latch having an engaged position in which said latch prevents lowering of said moveable lift engagement structure, and a disengaged position in which said latch does not prevent lowering of said moveable lift engagement structure; and b. a fourth electric switch configured to enable generation of said second signal and to generate a third control signal to enable disposing said latch in said disengaged position.

94. The vehicle lift of claim 92, wherein said control is configured to enable display of lift data, and said first and second switches are enabled in response to activation of said third switch to control selection of lift data enabled to be displayed.

95. The vehicle lift of claim 94 wherein selection of specific lift data enabled for display is menu driven.

96. The vehicle lift of claim 92 wherein at least one of said first, second and third electric switches comprises locations on a touch screen.

97. A vehicle service system comprising:

a. a central memory containing lift data; and b. a plurality of vehicle lifts, said lift data pertaining to said plurality of vehicle lifts, each vehicle lift comprising:

i) a moveable lift engagement structure; and ii) an electronic display networked to said central memory, said electronic display configured to display selected lift data contained in said memory.

98. The vehicle service system of claim 97 further comprising respective electronic controls associated with respective ones of said plurality of vehicle lifts, each said respective electronic control configured to enable display of said selected lift data by the respective electronic display electronic control.

99. The vehicle service system of claim 98 wherein each said respective electronic control is configured to selectively control raising and lowering the moveable lift engagement structure of the vehicle lift associated with said respective electronic control based upon user input.

100. The vehicle service system of claim 98 wherein each said respective electronic control is configured to receive a plurality of condition signals from said associated vehicle lift, each of said plurality of condition signals being respectively indicative of at least one of a plurality of lift conditions of said associated vehicle lift.

101. The vehicle service system of claim 100, wherein said central memory comprises predetermined criteria, said vehicle service system further comprising control logic configured to generate respective signals associated with a respective vehicle lift, said respective signals being indicative of respective maintenance conditions of said associated respective vehicle lift based upon said predetermined criteria.

102. The vehicle service system of claim 101, wherein each said respective electronic control comprises said maintenance control logic.

103. The vehicle service system of claim 98 wherein each said respective electronic control is configured to access service data, said service data being stored in a remote database accessed through a network.

104. The vehicle service system of claim 97, further comprising a central computer processor associated with said central memory.

105. The vehicle service system of claim 104, wherein said central computer processor is configured to receive a plurality of condition signals from each respective vehicle lift, each of said plurality of condition signals being respectively indicative of at least one of a plurality of lift conditions of said respective vehicle lift.

106. The vehicle service system of claim 97, further comprising at least one tool suitable for servicing a vehicle, said at least one tool being networked to said central memory.

107. The vehicle service system of claim 106, wherein each of said at least one tool is configured to determine tool conditions, and is configured to generate at least one respective signal, each signal being indicative of at least one of a plurality of tool conditions related to operation of said tool, each of said at least one tool being configured to transmit said at least one signal to said central memory.

108. The vehicle service system of claim 97 wherein said electronic display is configured to enable display of service data.

109. A vehicle service system comprising:

a. a computer communication network;

b. a central computer processor connected to said network; and c. a plurality of vehicle lifts, each vehicle lift comprising:

i) a moveable lift engagement structure; and ii) an electronic control connected to said network, said electronic control configured to selectively control raising and lowering said moveable lift engagement structure based upon user input.

110. The vehicle service system of claim 109 wherein for each respective lift, said system is configured to monitor operation conditions for said respective lift and wherein said electronic control comprises control logic which is configured to modify operation of said respective lift, from the operation called for by said user input, based upon predetermined criteria applied to one or more operation conditions.

111. The vehicle service system of claim 110 wherein said control logic is configured to generate a signal indicative of an operation fault condition based upon said predetermined criteria, and display of lift data indicative of said operation fault condition is enabled in response to generation of said signal.

112. The vehicle service system of claim 110 wherein said predetermined criteria is stored in a memory associated with said central computer processor.

113. The vehicle service system of claim 109 wherein said central computer processor comprises control logic which is configured to modify operation of said lift, from the operation called for by said user input, based upon predetermined criteria applied to one or more operation conditions.

114. A vehicle service system comprising:

a. a computer communication network;

b. a central memory containing lift data, said central memory being connected to said network; and c. a plurality of vehicle lifts, said lift data pertaining to said plurality of vehicle lifts, each vehicle lift comprising:

i) a moveable lift engagement structure; and ii) an electronic display connected to said network, said electronic display configured to display selected data contained in said central memory.

115. The vehicle service system of claim 114, further comprising respective electronic controls associated with respective ones of said plurality of vehicle lifts, each said respective electronic control being connected to said network and configured to enable display of said selected data by the respective electronic display electronic control.

116. The vehicle service system of claim 115 wherein each said respective electronic control is configured to selectively control raising and lowering the moveable lift engagement structure of the vehicle lift associated with said respective electronic control based upon user input.

117. The vehicle service system of claim 115 wherein each said respective electronic control is configured to receive a plurality of condition signals from said associated vehicle lift, each of said plurality of condition signals being respectively indicative of at least one of a plurality of lift conditions of said associated vehicle lift.

118. The vehicle service system of claim 117, wherein said central memory comprises predetermined criteria, said vehicle service system further comprising control logic configured to generate a signal associated with a respective vehicle lift, said respective signal being indicative of respective maintenance conditions of said associated respective vehicle lift based upon said predetermined criteria.

119. The vehicle service system of claim 118, wherein each said respective electronic control comprises said control logic.

120. The vehicle service system of claim 115 wherein said respective control is configured to access service data, said service data being stored in a remote database accessed through said network.

121. The vehicle service system of claim 114, further comprising a central computer processor connected to said network.

122. The vehicle service system of claim 121, wherein said central computer processor is configured to receive a plurality of condition signals from each respective vehicle lift, each of said plurality of condition signals being respectively indicative of at least one of a plurality of lift conditions of said respective vehicle lift.

123. The vehicle service system of claim 114, further comprising a plurality of tools suitable for servicing a vehicle, said plurality of tools being connected to said network.

124. The vehicle service system of claim 123, wherein each of said plurality of tools is configured to determine tool conditions, and is configured to generate at least one respective signal, each signal being indicative of at least one of a plurality of tool conditions related to operation of said tool, each of said plurality of tools configured to transmit said at least one respective signal to said network.

125. The vehicle lift of claim 114 wherein each said display is configured to enable display of service data.

126. A vehicle service system comprising:

a. a computer communication network;

b. a central computer processor connected to said network; and c. a plurality of vehicle lifts connected to said network, each vehicle lift comprising a moveable lift engagement structure; and d. control logic configured to determine whether a maintenance condition exists, and to generate respective signals indicative of respective maintenance conditions.

127. The vehicle service system of claim 126 wherein determination of whether a maintenance conditions exists is based upon said predetermined criteria and further comprising a central memory, said memory comprising said predetermined criteria.

128. The vehicle service system of claim 126, wherein said central computer processor is configured to receive a plurality of condition signals from at least a respective one of said plurality of vehicle lifts, each of said plurality of condition signals being respectively indicative of at least one of a plurality of lift conditions of said respective one of said plurality of vehicle lifts.

129. The vehicle service system of claim 126 further comprising respective electronic controls associated with respective ones of said plurality of vehicle lifts, each said respective electronic control being connected to said network and configured to selectively control raising and lowering said moveable lift engagement structure of said respective one of said plurality of vehicle lifts based upon user input.

130. The vehicle service system of claim 129 wherein each said respective electronic control is configured to receive a plurality of condition signals from said associated vehicle lift, each of said plurality of condition signals being respectively indicative of at least one of a plurality of lift conditions of said associated vehicle lift.

131. The vehicle system of claim 129, wherein each said respective electronic control comprises said control logic.

132. The vehicle service system of claim 126, further comprising a respective electronic control associated with a respective one of said plurality of vehicle lifts, each said respective electronic control configured to enable display of selected lift data.

133. A vehicle lift comprising:

a. movable lift engagement structure;

b. a control comprising:

i) first control logic configured to selectively control raising and lowering said moveable lift engagement structure in response to user input;

ii) second control logic configured to enable display of lift data in response to user input.

134. The vehicle lift of claim 133 wherein said first control logic is configured to operate independent of said second control logic, such that changes to said second control logic may be made without resulting in any change in said first control logic and without any change in operation of said first control logic.

135. The vehicle lift of claim 133 wherein said first control logic is carried by a circuit board which does not carry said second control logic.

136. The vehicle lift of claim 133 wherein said control is configured to monitor operation conditions and to determine whether an operation fault condition exists based on the application of predetermined criteria to said operation conditions, and said first control logic is configured to generate a signal indicative of an operation fault condition.

137. The vehicle lift of claim 136 wherein display of lift data indicative of said operation fault condition is enabled in response to generation of said signal.

138. The vehicle lift of claim 133 wherein said first control logic is configured to modify operation of said lift, from that called for by said user input, based upon predetermined criteria applied to one or more operation conditions.

139. The vehicle lift of claim 133 wherein said control is configured to determine whether a maintenance condition exists, and said second control logic is configured to generate a signal indicative of a maintenance condition.

140. The vehicle lift of claim 139 wherein predetermined criteria is applied to lift data to determine whether a maintenance condition exists.

141. The vehicle lift of claim 140 wherein said lift data consists of usage data.

142. The vehicle lift of claim 139 wherein display of lift data indicative of said maintenance condition is enabled in response to generation of said signal.

143. The vehicle lift of claim 133, wherein said second control logic is configured to inhibit movement of said movable lift engagement structure if a predetermined maintenance condition exists.

144. The vehicle lift of claim 143, wherein said second control logic is configured to permit movement of said movable lift structure in response to user input inputted after movement has been inhibited in response to the existence of a predetermined maintenance condition.

145. A vehicle service system comprising:

a. a computer communication network;

b. a central computer processor connected to said network;

c. a plurality of vehicle lifts connected to said network, each vehicle lift comprising a movable lift engagement structure;

d. first control logic configured to selectively control raising and lowering each moveable lift engagement structure individually in response to user input; and e. second control logic configured to enable display of lift data pertaining to said plurality of vehicle lifts.

146. The vehicle service system of claim 145 further comprising respective controls associated with respective lifts of said plurality of vehicle lifts, each said respective electronic control configured to cause said first control logic to execute to selectively control raising and lowering each moveable lift engagement structure.

147. The vehicle service system of claim 146 wherein said first control logic is resident in each of said controls.

148. The vehicle service system of claim 145 wherein said system is configured to monitor operation conditions for individual lifts and comprising third control logic configured to modify operation of individual lifts of said plurality of lifts, from the operation called for by said user input for that individual lift, based upon predetermined criteria applied to one or more operation conditions of said individual lift.

149. The vehicle service system of claim 145 wherein said system is configured to determine whether a maintenance condition associated with a respective vehicle lift exists and comprising third control logic operative to generate a signal associated with said respective vehicle lift, said respective signal being indicative of a maintenance condition.

150. The vehicle service system of claim 145 further comprising respective controls associated with respective lifts of said plurality of vehicle lifts, said second control logic being resident on said respective controls.

151. A vehicle lift comprising:

a. a moveable lift engagement structure;

b. a computer processor configured to selectively control raising and lowering said moveable lift engagement structure based upon user input;

c. a user interface configured to transmit user input to said computer processor; and d. an enclosure comprising a plate and an enclosure cover, said enclosure cover being configured to be carried by said plate, said computer processor being carried by said plate, said user interface being carried by said enclosure.

152. The vehicle lift of claim 151 wherein said enclosure comprises a non-metallic material.

153. The vehicle lift of claim 151 wherein said user interface is connected to said computer processor by a cable.

154. A two post vehicle lift, having first and second posts, said vehicle lift comprising:

a. a moveable lift engagement structure;

b. at least one latch carried respectively by one of said first post or said moveable lift engagement structure;

c. a control configured to selectively control raising and lowering said moveable lift engagement structure, said control being carried by said first post; and d. an enclosure enclosing at least a portion of said control, said enclosure enclosing said at least one latch.

155. The vehicle lift of claim 154 wherein said enclosure includes an opening which overlies said at least one latch, whereby said at least one latch can be accessed through said opening.

156. The vehicle lift of claim 155 further comprising a panel removably disposed in said opening.

157. A vehicle lift comprising:

a. a frame work;

b. a moveable lift engagement structure moveably supported by said frame work; and c. a communications port carried by said frame work.

158. A vehicle lift comprising:

a. a moveable lift engagement structure b. a control configured to control operation of said lift, said control configured to selectively display information in one of a plurality of languages.

159. The vehicle lift of claim 158 wherein the selection of the language in which said information is displayed is based on user input.

160. A vehicle lift comprising:

a. a moveable lift engagement structure; and b. a control configured to be used on a plurality of different lift types, said control having a plurality of selectable lift type modes, said control being selectively disposable in one of said selectable lift type modes.

161. The vehicle lift of claim 160 wherein the lift type mode in which said lift is disposed corresponds to the lift type.

162. A vehicle lift comprising:

a. a moveable lift engagement structure;

b. a control configured to control operation of said lift;

c. an enclosure, said control disposed within said enclosure; and d. a pneumatic connection carried by said enclosure, said pneumatic connection being accessible externally.

* * * * *